US012754205B2

(12) United States Patent
Kobayashi

(10) Patent No.: US 12,754,205 B2
(45) Date of Patent: Oct. 6, 2026

(54) INERTIAL SENSOR AND INERTIAL MEASUREMENT APPARATUS

(71) Applicant: SEIKO EPSON CORPORATION, Tokyo (JP)

(72) Inventor: Tomonaga Kobayashi, Chino (JP)

(73) Assignee: SEIKO EPSON CORPORATION (JP)

( * ) Notice: Subject to any disclaimer, the term of this patent is extended or adjusted under 35 U.S.C. 154(b) by 303 days.

(21) Appl. No.: 18/630,053

(22) Filed: Apr. 9, 2024

(65) Prior Publication Data

US 2024/0337676 A1 Oct. 10, 2024

(30) Foreign Application Priority Data

Apr. 10, 2023 (JP) ................................ 2023-063289

(51) Int. Cl.
*G01P 15/125* (2006.01)

(52) U.S. Cl.
CPC ................................ *G01P 15/125* (2013.01)

(58) Field of Classification Search
CPC .... G01P 15/125; G01P 1/023; G01P 15/0802; G01P 2015/0814; G01P 2015/0831; G01P 2015/0871; G01P 2015/0874; G01P 2015/0862; B81B 7/02; B81B 7/0016; B81B 2201/0228; B81B 2201/0235
See application file for complete search history.

(56) References Cited

U.S. PATENT DOCUMENTS 8,590,376 B2 * 11/2013 Reinert ................ G01P 15/125 73/514.32
2002/0158293 A1 10/2002 Lee et al.
2006/0213268 A1 9/2006 Asami et al.
2007/0119252 A1 5/2007 Adams et al.
2016/0332864 A1 11/2016 Iihola et al.
2016/0332872 A1 11/2016 Iihola et al.
2018/0321038 A1 11/2018 Liukku et al.
2018/0321275 A1 11/2018 Liukku et al.
2020/0408802 A1 12/2020 Tanaka
2020/0408803 A1 12/2020 Konno et al.
2021/0065990 A1 3/2021 Fujimoto et al.
2021/0171337 A1 6/2021 Liukku et al.
2021/0255212 A1 * 8/2021 Nagata .................... G01P 15/08
2021/0405083 A1 12/2021 Takizawa et al.
2022/0011339 A1 1/2022 Takizawa et al.

(Continued)

FOREIGN PATENT DOCUMENTS

JP 2003-014778 A 1/2003
JP 2006-266873 A 10/2006

(Continued)

*Primary Examiner* — David Z Huang
(74) *Attorney, Agent, or Firm* — Harness, Dickey & Pierce, P.L.C.

(57) ABSTRACT

An inertial sensor includes a support substrate as a substrate, a lid provided to face the support substrate, a movable frame provided between the support substrate and the lid, a first comb-teeth movable electrode and/or a second comb-teeth movable electrode as a comb-teeth movable electrode provided in the movable frame, and a protrusion provided at least one of the support substrate or the lid and overlapping a tip end or a base part of the first comb-teeth movable electrode and/or the second comb-teeth movable electrode in a plan view.

10 Claims, 15 Drawing Sheets

(56) References Cited

U.S. PATENT DOCUMENTS

| | | | |
|---|---|---|---|
| 2022/0155335 A1 | 5/2022 | Tanaka |
| 2023/0136163 A1 | 5/2023 | Tanaka |
| 2023/0138452 A1 | 5/2023 | Tanaka |
| 2023/0168273 A1 | 6/2023 | Tanaka |
| 2023/0266126 A1 | 8/2023 | Takizawa et al. |

FOREIGN PATENT DOCUMENTS

| | | |
|---|---|---|
| JP | 2009-500635 A | 1/2009 |
| JP | 2013-104868 A | 5/2013 |
| JP | 2015-206709 A | 11/2015 |
| JP | 2018-515353 A | 6/2018 |
| JP | 2019-023613 A | 2/2019 |
| JP | 2019-023614 A | 2/2019 |
| JP | 2021-004791 A | 1/2021 |
| JP | 2021-004875 A | 1/2021 |
| JP | 2021-032819 A | 3/2021 |
| JP | 2021-524035 A | 9/2021 |
| JP | 2022-006389 A | 1/2022 |
| JP | 2022-014567 A | 1/2022 |
| JP | 2022-079809 A | 5/2022 |
| JP | 2023-066598 A | 5/2023 |
| JP | 2023-066602 A | 5/2023 |
| JP | 2023-080591 A | 6/2023 |
| JP | 2023-121379 A | 8/2023 |

* cited by examiner

INERTIAL SENSOR AND INERTIAL MEASUREMENT APPARATUS

The present application is based on, and claims priority from JP Application Ser. No. 2023-063289, filed Apr. 10, 2023, the disclosure of which is hereby incorporated by reference herein in its entirety.

BACKGROUND

1. Technical Field

The present disclosure relates to an inertial sensor and an inertial measurement apparatus including the inertial sensor.

2. Related Art

In recent years, an inertial sensor using a micro electro mechanical system (MEMS) structure is developed. As such an inertial sensor, JP-A-2021-32819 discloses an acceleration sensor that detects an acceleration in the Z-axis direction.

The acceleration sensor disclosed in JP-A-2021-32819 includes a first conductor, a first electrode held by the first conductor, a second conductor, and a second electrode held by the second conductor, in which a length of the first electrode in the height direction is shorter than a length of the first conductor in the height direction, and a length of the second electrode in the height direction is longer than a length of the second conductor in the height direction.

When an excessive acceleration is applied to such an acceleration sensor, there is a problem in that cracks or chips occur in the MEMS structure such as the first conductor and the first electrode.

SUMMARY

According to an aspect of the present disclosure, there is provided an inertial sensor including a substrate, a lid provided to face the substrate, a movable frame provided between the substrate and the lid, a comb-teeth movable electrode provided in the movable frame, and a protrusion provided on at least one of the substrate or the lid and overlapping a tip end or a base part of the comb-teeth movable electrode in a plan view.

According to another aspect of the present disclosure, there is provided an inertial measurement apparatus including the inertial sensor described above.

DESCRIPTION OF EMBODIMENTS

Hereinafter, embodiments of the present disclosure will be described with reference to the drawings.

In each of the following drawings, in order to make each component easier to see, the scale of the dimension may be different depending on the component.

Further, for convenience of explanation, three axes including an X axis, a Y axis, and a Z axis, which are orthogonal to each other, are illustrated, a tip end side of an arrow illustrating an axis direction is referred to as a "+side", and a base end side is referred as a "– side". Further, in the following, a direction parallel to the X axis is referred to as an "X-axis direction", a direction parallel to the Y axis is referred to as a "Y-axis direction", and a direction parallel to the Z axis is referred to as a "Z-axis direction". Further, in the following, viewing in the Z-axis direction is referred to as "plan view", and viewing of a cross section including the z axis from the Y-axis direction is referred to as "cross-sectional view".

Further, in the following description, for example, with respect to a substrate, the description of "on the substrate" refers to any of a case of being disposed to come into contact with the substrate, a case of being disposed on the substrate via another structure, or a case of being disposed so that a part comes into contact on the substrate and a part is disposed via another structure. Further, the description of the upper surface of a certain configuration indicates the surface of the configuration on the + side in the Z-axis direction, for example, the "upper surface of the electrode" indicates the surface of the electrode on the + side in the Z-axis direction. Further, the description of the lower surface of a certain configuration indicates the surface of the configuration on the – side in the Z-axis direction, for example, the "lower surface of the electrode" indicates the surface of the electrode on the – side in the Z-axis direction.

1. Embodiment 1

A schematic configuration of an inertial sensor 100 according to Embodiment 1 will be described with reference to FIGS. 1 to 3.

Figure 1:
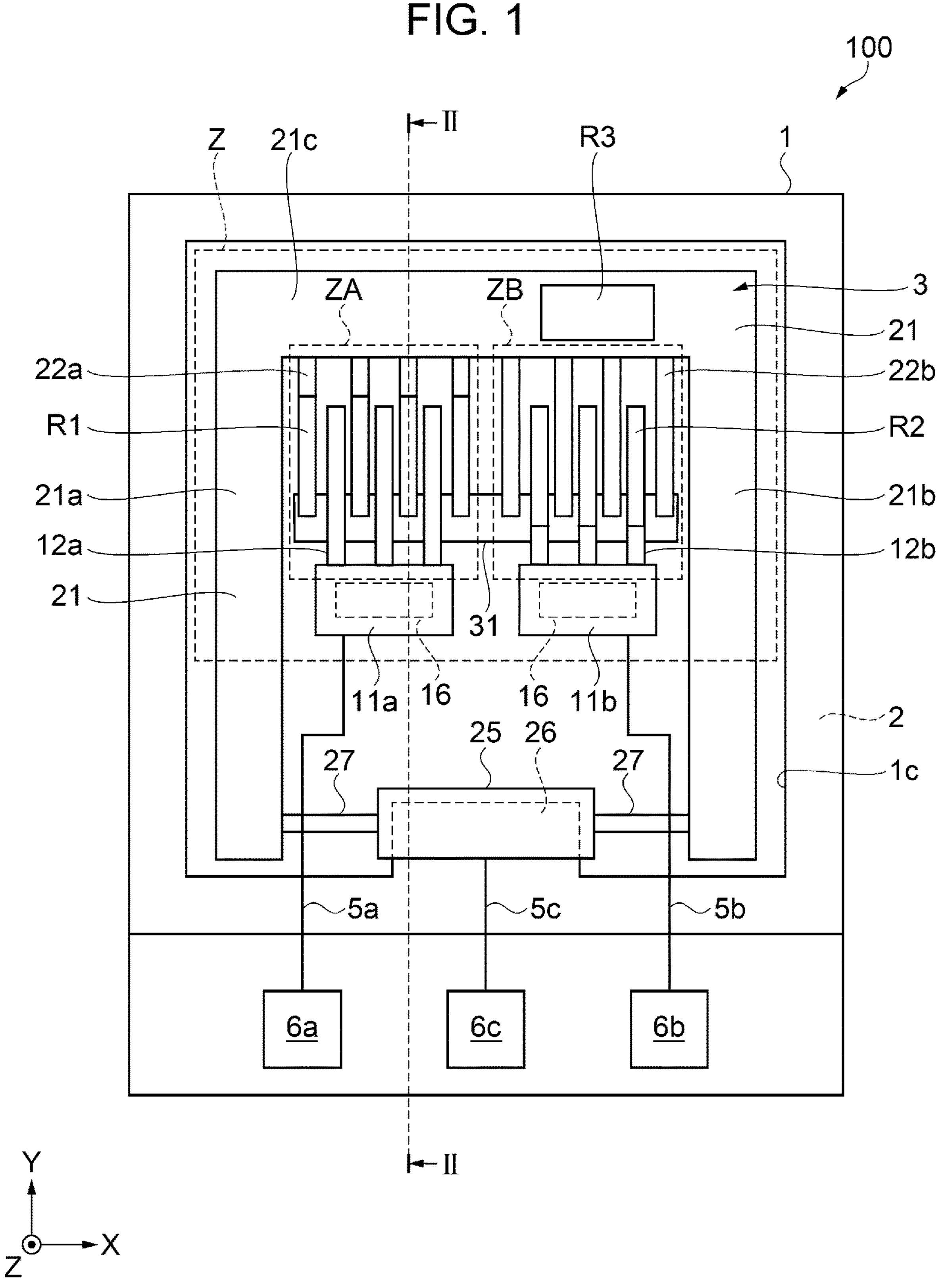
FIG. 1 is a plan view of an inertial sensor according to Embodiment 1.

FIG. 1 is a plan view schematically illustrating the inertial sensor 100 according to Embodiment 1. FIG. 2 is a cross-sectional view taken along the line II-II in FIG. 1. FIG. 3 is a partially enlarged perspective view of an element. In FIG. 1, a lid 2 is made transparent for convenience of description.

The inertial sensor 100 is a physical amount sensor that detects a change in physical amount due to displacement of a substantially inverted U-shaped movable frame 21, as a change in capacitance. In the present embodiment, the inertial sensor 100 is an acceleration sensor that measures an acceleration in the Z-axis direction based on the displacement of the movable frame 21.

Figure 2:
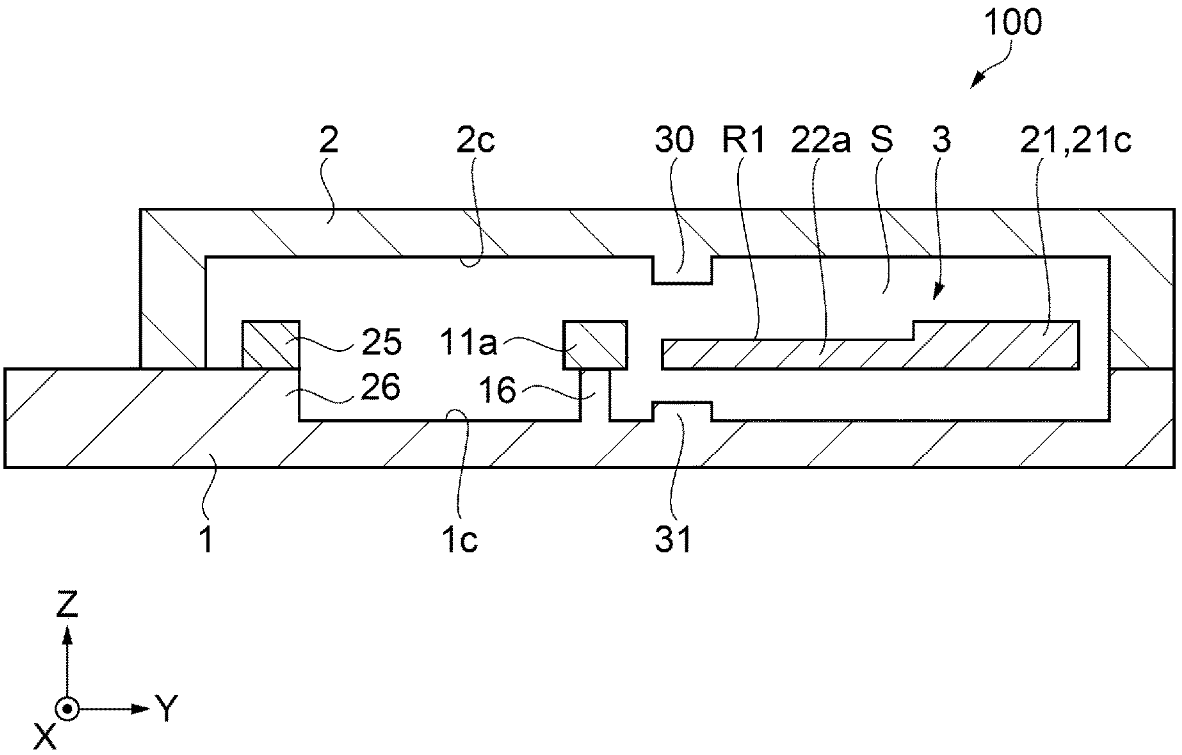
FIG. 2 is a cross-sectional view of the inertial sensor taken along the line II-II in FIG. 1.

As illustrated in FIG. 2, the inertial sensor 100 includes a support substrate 1, the lid 2 bonded to the support substrate 1, and an element 3 provided between the support substrate 1 and the lid 2.

1.1. Support Substrate

The support substrate 1 has a cavity 1*c* including a recess, and a mount 16, a mount 26, and a protrusion 31 are provide in the cavity 1*c*.

In the present embodiment, the support substrate 1 is made of a silicon substrate and can be formed by patterning the silicon substrate. The support substrate 1 may be a glass substrate or a ceramic substrate.

1.2. Lid

The lid 2 has a cavity 2*c* including a recess, and a protrusion 30 is provided in the cavity 2*c*.

In the present embodiment, the lid 2 is made of a glass substrate and can be formed by patterning the glass substrate. The lid 2 may be a silicon substrate or a ceramic substrate.

1.3. Element

The element 3 is provided in an accommodation space S including the cavity 1*c* and the cavity 2*c*.

The element 3 is made of, for example, a silicon substrate doped with impurities, such as phosphorus (P) and boron (B), and can be formed by patterning the silicon substrate.

As illustrated in FIG. 1, the element 3 includes a detector Z that detects an acceleration in the Z-axis direction.

The detector Z includes a movable electrode and a fixed electrode.

1.3.1. Movable Electrode

The movable electrode includes the movable frame 21, a first comb-teeth movable electrode 22*a*, a second comb-teeth movable electrode 22*b*, a fixing area 25, and a beam 27. These portions are integrally formed and electrically coupled to each other.

The movable frame 21 has a substantially inverted U shape. The movable frame 21 includes a first extension 21*a* and a second extension 21*b* which are extending in the Y-axis direction, and a coupler 21*c* which is extending in an X-axis direction.

The coupler 21*c* of the movable frame 21 is provided with the first comb-teeth movable electrode 22*a* and the second comb-teeth movable electrode 22*b*.

The first comb-teeth movable electrode 22*a* and the second comb-teeth movable electrode 22*b* extend along the Y-axis direction, respectively, and have ends which are coupled to the coupler 21*c* on the + side in the Y-axis direction.

In the present embodiment, a joint part is, for example, a part at which the first comb-teeth movable electrode 22*a* is coupled to the coupler 21*c*. More specifically, when a joint is an end of the first comb-teeth movable electrode 22*a* on fixed end side, the joint part includes the joint and the peripheral part thereof. Further, in the present embodiment, the tip end is, for example, an end of the first comb-teeth movable electrode 22*a* on the free end side, and the base part is, for example, a part close to the joint of the first comb-teeth movable electrode 22*a* in the first comb-teeth movable electrode 22*a*. The same applies to other electrodes and frames.

The ends of the first extension 21*a* and the second extension 21*b* in the movable frame 21 on the − side in the Y-axis direction are fixed to the fixing area 25 via the beam 27.

The fixing area 25 is bonded to the upper surface of the mount 26 of the support substrate 1.

The beam 27 functions as a spring. Specifically, the beam 27 is a torsion bar.

When the movable frame 21 receives an inertial force in the Z-axis direction, the beam 27 is twisted using the fixing area 25 as an anchor. Due to such a twisting action, the movable frame 21 swings in the Z-axis direction using the beam 27 as a rotation axis.

In this manner, the movable electrode has a structure referred to as a single-sided seesaw structure.

1.3.2. Fixed Electrode

The fixed electrode includes a first fixed frame 11*a*, a second fixed frame 11*b*, a first comb-teeth fixed electrode 12*a*, and a second comb-teeth fixed electrode 12*b*.

Each of the first fixed frame 11*a* and the second fixed frame 11*b* is bonded to the upper surface of the mount 16 of the support substrate 1.

The first comb-teeth fixed electrode 12*a* extends along the Y-axis direction, and has one end which is coupled to the first fixed frame 11*a* on the − side in the Y-axis direction.

The second comb-teeth fixed electrode 12*b* extends along the Y-axis direction, and has one end which is coupled to the second fixed frame 11*b* on the − side in the Y-axis direction.

The first comb-teeth fixed electrode 12*a* is electrically coupled to an electrode pad 6*a* via wiring 5*a*.

The second comb-teeth fixed electrode 12*b* is electrically coupled to an electrode pad 6*b* via wiring 5*b*.

The first comb-teeth movable electrode 22*a* and the second comb-teeth movable electrode 22*b* are electrically coupled to an electrode pad 6*c* via wiring 5*c*.

1.3.3. Protrusion

The support substrate 1 has the protrusion 31. Further, the lid 2 has the protrusion 30. Although not illustrated, the plan shape of the protrusion 30 is substantially the same as that of the protrusion 31.

Both the protrusion 31 and the protrusion 30 are stoppers for suppressing the significant vibration of the first comb-teeth movable electrode 22*a*, the second comb-teeth movable electrode 22*b*, the first comb-teeth fixed electrode 12*a*, and/or the second comb-teeth fixed electrode 12*b*.

In order to cause the protrusion 31 and the protrusion 30 to function as the stoppers, the protrusion 31 and the protrusion 30 are disposed at positions overlapping the first comb-teeth movable electrode 22*a*, the second comb-teeth movable electrode 22*b*, the first comb-teeth fixed electrode 12*a*, and/or the second comb-teeth fixed electrode 12*b* in a plan view.

In the present embodiment, the protrusion 31 and the protrusion 30 overlap the tip ends of the first comb-teeth movable electrode 22*a* and the second comb-teeth movable electrode 22*b* in a plan view. Further, the protrusion 31 and the protrusion 30 overlap the base parts of the first comb-teeth fixed electrode 12*a* and the second comb-teeth fixed electrode 12*b* in a plan view.

In the present embodiment, the protrusion 31 and the protrusion 30 are disposed at a position overlapping each other in a plan view, but the protrusion 31 and the protrusion 30 may be disposed at positions not overlapping each other in a plan view. For example, the protrusion 31 may be disposed at a position overlapping the tip ends of the first comb-teeth movable electrode 22*a* and the second comb-teeth movable electrode 22*b* in a plan view, and the protrusion 30 may be disposed at a position overlapping the base parts of the first comb-teeth movable electrode 22*a* and the second comb-teeth movable electrode 22*b* in a plan view.

Further, the disposition of either the protrusion 31 or the protrusion 30 may be omitted.

Further, the protrusion 31 may include a plurality of protrusions. For example, when the protrusion 31 includes two protrusions, one protrusion 31 may be provided to overlap the tip end of the first comb-teeth movable electrode 22*a*, and another protrusion 31 may be provided to overlap the tip end of the second comb-teeth movable electrode 22*b*.

Further, the protrusion 30 may include a plurality of protrusions. For example, when the protrusion 30 includes two protrusions, one protrusion 30 may be provided to overlap the tip end of the first comb-teeth movable electrode 22*a*, and another protrusion 30 may be provided to overlap the tip end of the second comb-teeth movable electrode 22*b*.

When an excessive acceleration is applied to the inertial sensor 100, the first comb-teeth movable electrode 22*a* and/or the second comb-teeth movable electrode 22*b* comes into contact with the protrusion 31 or the protrusion 30 before the vibration width exceeds a measurement range and becomes excessively large. Further, the first comb-teeth fixed electrode 12*a* and/or the second comb-teeth fixed electrode 12*b* comes into contact with the protrusion 31 or the protrusion 30 before the vibration width becomes excessively large.

In other words, the first comb-teeth movable electrode 22*a*, the second comb-teeth movable electrode 22*b*, the first comb-teeth fixed electrode 12*a*, and the second comb-teeth fixed electrode 12*b* are limited by the protrusion 31 and/or the protrusion 30 so that the vibration width does not become excessively large.

Therefore, the inertial sensor 100 according to the present embodiment includes the protrusion 31 and/or the protrusion 30. Therefore, even when an excessive acceleration is applied to the inertial sensor 100, the occurrence of cracks or chips can be suppressed or avoided in the first comb-teeth movable electrode 22*a*, the second comb-teeth movable electrode 22*b*, the first comb-teeth fixed electrode 12*a*, and/or the second comb-teeth fixed electrode 12*b*.

Further, the protrusion 31 suppresses the first comb-teeth movable electrode 22*a*, the second comb-teeth movable electrode 22*b*, the first comb-teeth fixed electrode 12*a*, and/or the second comb-teeth fixed electrode 12*b* from coming into contact with or colliding with the bottom surface of the cavity 1*c*. Further, the protrusion 30 suppresses the first comb-teeth movable electrode 22*a*, the second comb-teeth movable electrode 22*b*, the first comb-teeth fixed electrode 12*a*, and/or the second comb-teeth fixed electrode 12*b* from coming into contact with or colliding with the bottom surface of the cavity 2*c*.

In other words, the first comb-teeth movable electrode 22*a*, the second comb-teeth movable electrode 22*b*, the first comb-teeth fixed electrode 12*a*, and/or the second comb-teeth fixed electrode 12*b* is protected so as not to come into contact with or collide with the bottom surface of the cavity 1*c* by the protrusion 31. Further, the first comb-teeth movable electrode 22*a*, the second comb-teeth movable electrode 22*b*, the first comb-teeth fixed electrode 12*a*, and/or the second comb-teeth fixed electrode 12*b* is protected so as not to come into contact with or collide with the bottom surface of the cavity 2*c* by the protrusion 30.

Therefore, the inertial sensor 100 according to the present embodiment includes the protrusion 31 and/or the protrusion 30. Therefore, even when an excessive acceleration is applied to the inertial sensor 100, the occurrence of cracks or chips can be suppressed in the first comb-teeth movable electrode 22*a*, the second comb-teeth movable electrode 22*b*, the first comb-teeth fixed electrode 12*a*, and/or the second comb-teeth fixed electrode 12*b*.

Further, the protrusion 31 and/or the protrusion 30 has an effect of suppressing the first comb-teeth movable electrode 22*a*, the second comb-teeth movable electrode 22*b*, the first comb-teeth fixed electrode 12*a*, and/or the second comb-teeth fixed electrode 12*b* from adhering to the support substrate 1 or the lid 2.

1.3.4. Detector

The detector Z includes a detector ZA and a detector ZB. Each of the detector ZA and the detector ZB detects the acceleration in the Z-axis direction.

The detector ZA includes the first comb-teeth movable electrode 22*a*, and the first comb-teeth fixed electrode 12*a* adjacent to the first comb-teeth movable electrode 22*a*. Further, the detector ZB includes a plurality of second comb-teeth movable electrodes 22*b* and a plurality of second comb-teeth fixed electrodes 12*b*.

Figure 3:
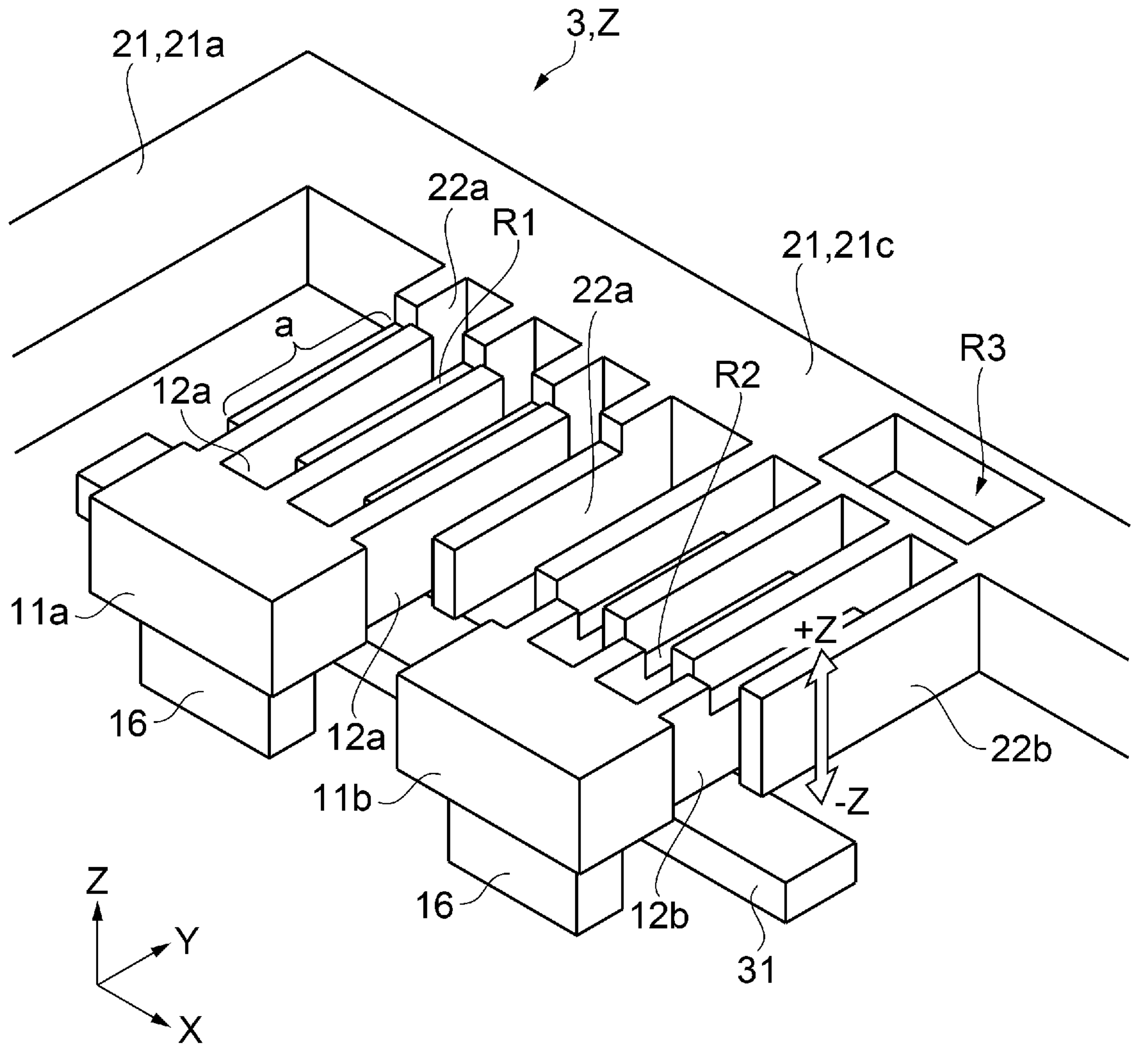
FIG. 3 is a partially enlarged perspective view of an element.

As illustrated in FIG. 3, the first comb-teeth movable electrode 22*a* has a recess R1. The recess R1 is a part obtained by partially recessing a part of the thickness of the first comb-teeth movable electrode 22*a* in the Z-axis direction. Specifically, the thickness of the first comb-teeth movable electrode 22*a*, which corresponds to a range indicated by reference numeral a in FIG. 3, is reduced in the Z-axis direction in the recess R1.

The first comb-teeth movable electrode 22*a* has the same thickness as the thickness of the movable frame 21 in the Z-axis direction from the joint part to a certain range, but has a reduced thickness in the Z-axis direction mainly in a region facing the first comb-teeth fixed electrode 12*a*.

On the other hand, the first comb-teeth fixed electrode 12*a* has the same thickness as the thickness of the first fixed frame 11*a* in the Z-axis direction over the entire area from the joint part to the tip end.

The second comb-teeth fixed electrode 12*b* has a recess R2. The recess R2 is a part obtained by partially recessing a part of the thickness of the second comb-teeth fixed electrode 12*b* in the Z-axis direction.

The second comb-teeth fixed electrode 12*b* has the same thickness as the thickness of the second fixed frame 11*b* in the Z-axis direction from the joint part to a certain range, but has a reduced thickness in the Z-axis direction mainly in a region facing the second comb-teeth movable electrode 22*b*.

On the other hand, the second comb-teeth movable electrode 22*b* has the same thickness as the thickness of the movable frame 21 in the Z-axis direction over the entire area from the joint part to the tip end.

In this way, the thickness of the first comb-teeth movable electrode 22*a* and the thickness of the second comb-teeth fixed electrode 12*b* are partially reduced. Therefore, the inertial sensor 100 causes the facing area between the first comb-teeth movable electrode 22*a* and the first comb-teeth fixed electrode 12*a* to be reduced in the detector ZA when an acceleration on the + side in the Z-axis direction occurs, and causes the facing area between the second comb-teeth movable electrode 22*b* and the second comb-teeth fixed electrode 12*b* to be reduced in the detector ZB when the acceleration on the − side in the Z-axis direction occurs.

Therefore, the inertial sensor 100 according to the present embodiment can detect the acceleration on the + side in the Z-axis direction and the acceleration on the – side in the Z-axis direction by detecting the reduction in the facing areas between the detectors ZA and ZB, as the change in the capacitance.

A recess R3 is provided in a part of the coupler 21*c* of the movable frame 21. The recess R3 eliminates unevenness of the mass of the coupler 21*c* of the movable frame 21 in the X-axis direction due to the recess R1. Therefore, the deviation of the rotational motion due to the acceleration of the movable frame 21 in the Z-axis direction can be corrected.

1.4. Modification Example

The embodiments of the protrusion 31 and the protrusion 30 described above may be variously modified. Specific modification aspects of the protrusion 31 and the protrusion 30 will be described below as examples.

1.4.1 Modification Example 1

Figure 4A:
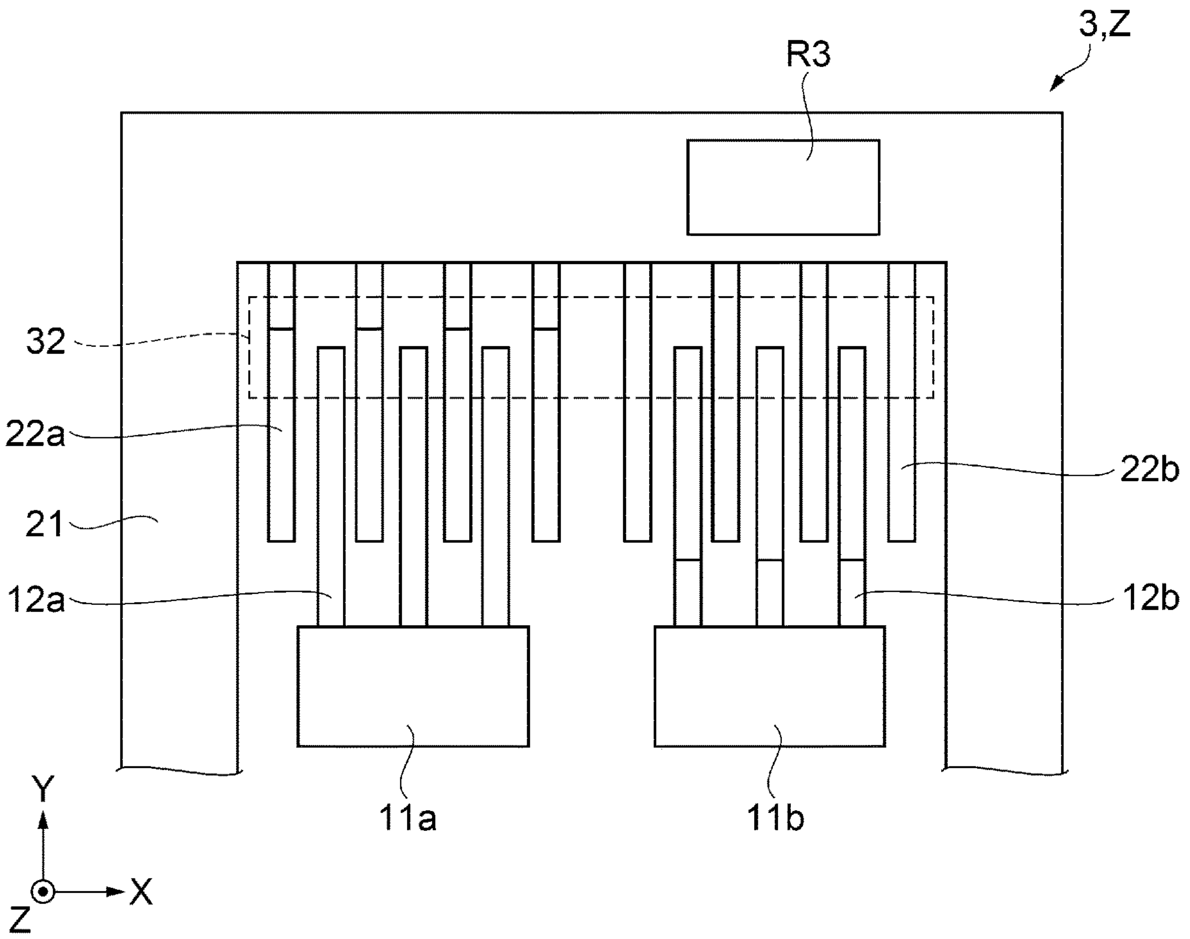
FIG. 4A is an enlarged plan view of an element according to Modification Example 1.

FIG. 4A is an enlarged plan view of an element according to Modification Example 1, and is an enlarged view of a range of the detector Z of the element 3 indicated by a broken line in FIG. 1.

A protrusion 32 indicates a protrusion according to Modification Example 1. The protrusion 32 corresponds to the protrusion 31 and/or the protrusion 30 described above. In FIG. 4A, the disposition position of the protrusion 32 is indicated by a broken line. Further, the protrusion 32 may be provided on both the support substrate 1 and the lid 2, or may be provided only on either one. The same applies to other Modification Examples described later.

The protrusion 32 overlaps the base part of the first comb-teeth movable electrode 22*a* and the base part of the second comb-teeth movable electrode 22*b* in a plan view. Further, the protrusion 32 overlaps the tip end of the first comb-teeth fixed electrode 12*a* and the tip end of the second comb-teeth fixed electrode 12*b* in a plan view.

1.4.2. Modification Example 2

Figure 4B:
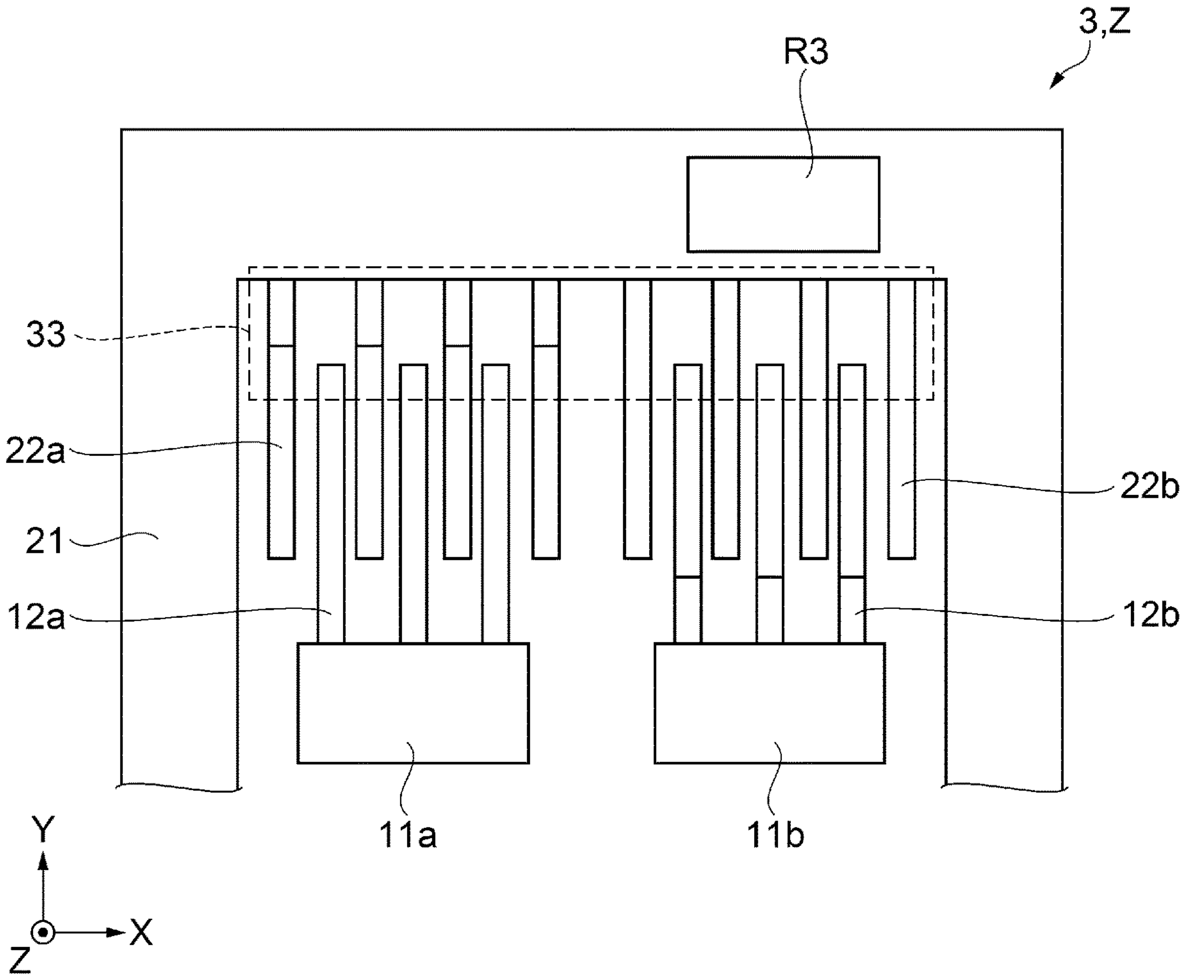
FIG. 4B is an enlarged plan view of an element according to Modification Example 2.

FIG. 4B is an enlarged plan view of an element according to Modification Example 2, and is an enlarged view of a range of the detector Z of the element 3 indicated by a broken line in FIG. 1.

A protrusion 33 indicates a protrusion according to Modification Example 2. The protrusion 33 corresponds to the protrusion 31 and/or the protrusion 30 described above. In FIG. 4B, the disposition position of the protrusion 33 is indicated by a broken line.

The protrusion 33 overlaps the joint part and the base part of the first comb-teeth movable electrode 22*a* and the joint part and the base part of the second comb-teeth movable electrode 22*b* in a plan view. Further, the protrusion 33 overlaps the tip end of the first comb-teeth fixed electrode 12*a* and the tip end of the second comb-teeth fixed electrode 12*b* in a plan view.

1.4.3. Modification Example 3

Figure 4C:
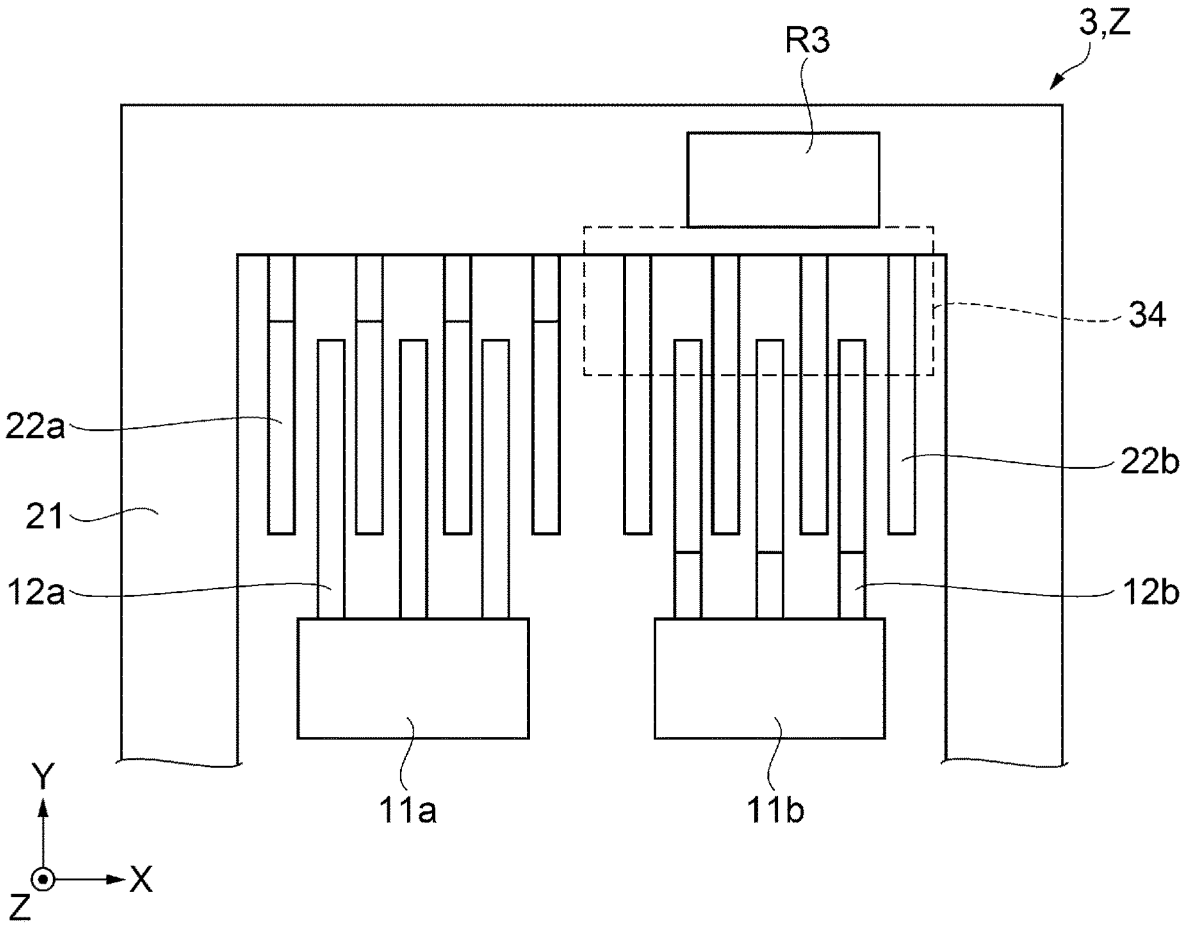
FIG. 4C is an enlarged plan view of an element according to Modification Example 3.

FIG. 4C is an enlarged plan view of an element according to Modification Example 3, and is an enlarged view of a range of the detector Z of the element 3 indicated by the broken line in FIG. 1.

A protrusion 34 indicates a protrusion according to Modification Example 3. The protrusion 34 corresponds to the protrusion 31 and/or the protrusion 30 described above. In FIG. 4C, the disposition position of the protrusion 34 is indicated by a broken line.

In a plan view, the protrusion 34 overlaps the joint part and the base part of the second comb-teeth movable electrode 22*b* and does not overlap the first comb-teeth movable electrode 22*a*.

When the protrusion is not provided due to routing of the wiring or the like, a configuration in which some of the first comb-teeth movable electrode 22*a* and the second comb-teeth movable electrode 22*b* do not overlap the protrusions may be provided as in Modification Example 3. When the protrusion 34 is provided, it is preferable that a plurality of protrusions 34 is provided such that the first comb-teeth movable electrode 22*a* and the second comb-teeth movable electrode 22*b* overlap any one of the plurality of protrusions 34.

1.4.4. Modification Example 4

Figure 4D:
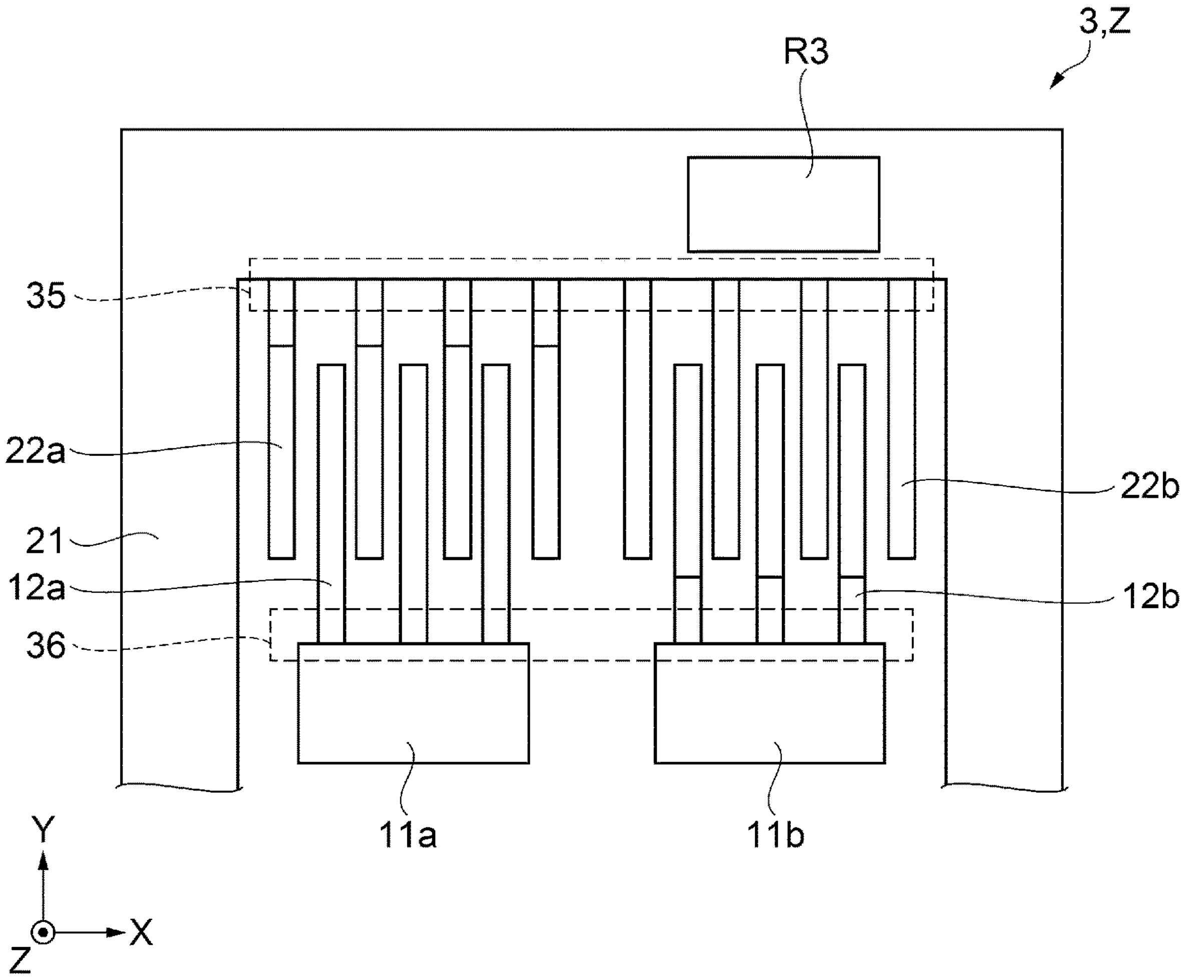
FIG. 4D is an enlarged plan view of an element according to Modification Example 4.

FIG. 4D is an enlarged plan view of an element according to Modification Example 4, and is an enlarged view of a range of the detector Z of the element 3 indicated by the broken line in FIG. 1.

A protrusion 35 and a protrusion 36 indicate protrusions according to Modification Example 4. The protrusion 35 corresponds to the protrusion 31 and/or the protrusion 30 described above. The protrusion 36 corresponds to the protrusion 31 and/or the protrusion 30 described above. In FIG. 4D, the disposition positions of the protrusion 35 and the protrusion 36 are indicated by broken lines.

The protrusion 35 overlaps the joint part and the base part of the first comb-teeth movable electrode 22*a* and the joint part and the base part of the second comb-teeth movable electrode 22*b* in a plan view.

The protrusion 36 overlaps the joint part and the base part of the first comb-teeth fixed electrode 12*a* and the joint part and the base part of the second comb-teeth fixed electrode 12*b* in a plan view.

1.4.5. Modification Example 5

Figure 4E:
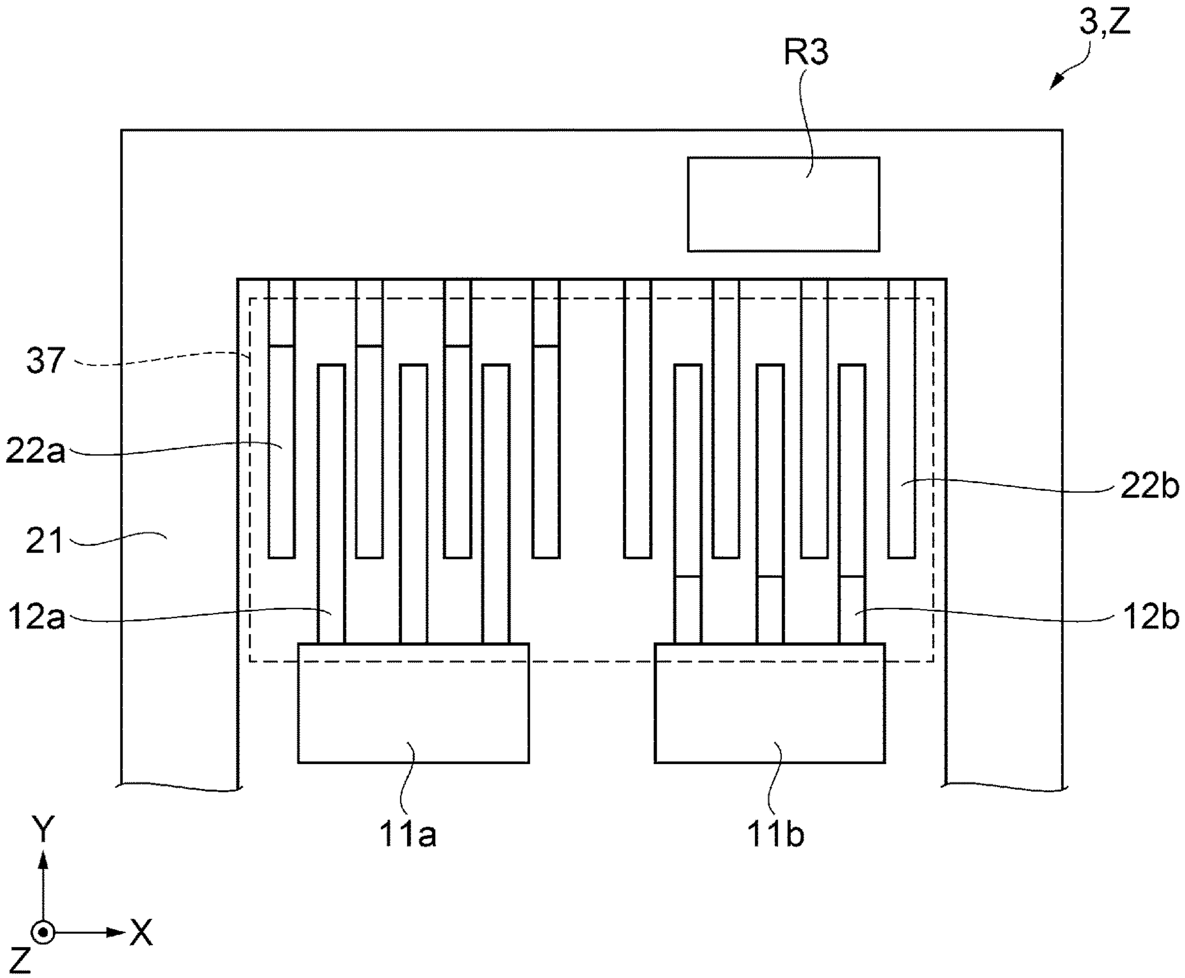
FIG. 4E is an enlarged plan view of an element according to Modification Example 5.

FIG. 4E is an enlarged plan view of an element according to Modification Example 5, and is an enlarged view of the range of the detector Z of the element 3 indicated by the broken line in FIG. 1.

A protrusion 37 indicates a protrusion according to Modification Example 5. The protrusion 37 corresponds to the protrusion 31 and/or the protrusion 30 described above. In FIG. 4E, the disposition position of the protrusion 37 is indicated by a broken line.

The protrusion 37 overlaps from the base part to the tip end of the first comb-teeth movable electrode 22*a* and from the base part to the tip end of the second comb-teeth movable electrode 22*b* in a plan view. Further, the protrusion 37 overlaps from the joint part to the tip end of the first comb-teeth fixed electrode 12*a* and from the joint part to the tip end the second comb-teeth fixed electrode 12*b* in a plan view. The protrusion 37 may overlap the joint part of the first comb-teeth movable electrode 22*a* and/or the joint part of the second comb-teeth movable electrode 22*b*. Further, the protrusion 37 may not overlap the joint part of the first comb-teeth fixed electrode 12*a* and/or the joint part of the second comb-teeth fixed electrode 12*b*. In other words, the protrusion 37 overlaps from the base part to the tip end of the first comb-teeth fixed electrode 12*a* and from the base part to the tip end of the second comb-teeth fixed electrode 12*b* in a plan view.

As described above, the inertial sensor 100 according to the present embodiment includes the support substrate 1 as a substrate, the lid 2 provided to face the support substrate 1, the movable frame 21 provided between the support substrate 1 and the lid 2, the first comb-teeth movable electrode 22*a* and/or the second comb-teeth movable electrode 22*b* as the comb-teeth movable electrode provided in the movable frame 21, and the protrusion 31 and/or the protrusion 30 provided on at least one of the support substrate 1 or the lid 2 and overlapping the tip end or the base part of the first comb-teeth movable electrode 22*a* and/or the second comb-teeth movable electrode 22*b* in a plan view.

As described above, the protrusion 31 and/or the protrusion 30 is provided which overlaps the tip end or the base part of the first comb-teeth movable electrode 22*a* and/or the second comb-teeth movable electrode 22*b* in a plan view. Therefore, even when an excessive acceleration is applied to the inertial sensor 100, the occurrence of cracks or chips can be suppressed or avoided in the first comb-teeth movable electrode 22*a* and/or the second comb-teeth movable electrode 22*b*.

Therefore, a highly reliable inertial sensor 100 can be realized by suppressing the occurrence of cracks or chips in the MEMS structure that causes a failure.

The inertial sensor 100 according to the present embodiment further includes the first fixed frame 11*a* and/or the second fixed frame 11*b* as the fixed frame provided between the support substrate 1 and the lid 2, and, as the comb-teeth fixed electrode, the first comb-teeth fixed electrode 12*a* provided in the first fixed frame 11*a* and/or the second comb-teeth fixed electrode 12*b* provided in the second fixed frame 11*b*, in which the protrusion 31 and/or the protrusion 30 overlaps the first comb-teeth fixed electrode 12*a* and/or the second comb-teeth fixed electrode 12*b* in a plan view.

As described above, the protrusion 31 and/or the protrusion 30 is provided which overlaps the first comb-teeth fixed electrode 12*a* and/or the second comb-teeth fixed electrode 12*b* in a plan view. Therefore, even when an excessive acceleration is applied to the inertial sensor 100, the occurrence of cracks or chips can be suppressed or avoided in the first comb-teeth fixed electrode 12*a* and/or the second comb-teeth fixed electrode 12*b*.

Further, in the inertial sensor 100 according to the present embodiment, the protrusion 31 or the protrusion 30 overlaps the joint part of the first comb-teeth movable electrode 22*a* and/or the second comb-teeth movable electrode 22*b* and the movable frame 21 in a plan view.

As described above, the protrusion 31 and/or the protrusion 30 overlaps the joint part of the first comb-teeth movable electrode 22*a* and the movable frame 21 and/or the joint part of the second comb-teeth movable electrode 22*b* and the movable frame 21 in a plan view. Therefore, even when an excessive acceleration is applied to the inertial sensor 100, the occurrence of cracks or chips can be suppressed or avoided in the first comb-teeth movable electrode 22*a*, the second comb-teeth movable electrode 22*b*, and/or the movable frame 21.

Further, in the inertial sensor 100 according to the present embodiment, the protrusion 31 and/or the protrusion 30 overlaps the base part of the first comb-teeth movable electrode 22*a* and/or the second comb-teeth movable electrode 22*b* in a plan view.

As described above, the protrusion 31 and/or the protrusion 30 overlaps the base part of the first comb-teeth movable electrode 22*a* and/or the base part of the second comb-teeth movable electrode 22*b* in a plan view. Therefore, even when an excessive acceleration is applied to the inertial sensor 100, the occurrence of cracks or chips can be suppressed or avoided in the first comb-teeth movable electrode 22*a*, the second comb-teeth movable electrode 22*b*, and/or the movable frame 21.

Further, in the inertial sensor 100 according to the present embodiment, the protrusion 31 and/or the protrusion 30 overlaps the tip end of the first comb-teeth movable electrode 22*a* and/or the second comb-teeth movable electrode 22*b* in a plan view.

As described above, the protrusion 31 and/or the protrusion 30 overlaps the tip end of the first comb-teeth movable electrode 22*a* and/or the tip end of the second comb-teeth movable electrode 22*b* in a plan view. Therefore, even when an excessive acceleration is applied to the inertial sensor 100, the occurrence of cracks or chips can be suppressed or avoided in the first comb-teeth movable electrode 22*a*, the second comb-teeth movable electrode 22*b*, and/or the movable frame 21.

Further, in the inertial sensor 100 according to the present embodiment, the protrusion 31 or the protrusion 30 overlaps from the base part to the tip end of the first comb-teeth movable electrode 22*a* and/or the second comb-teeth movable electrode 22*b* and the base part of the first comb-teeth fixed electrode 12*a* and/or the second comb-teeth fixed electrode 12*b* in a plan view.

As described above, the protrusion 31 and/or the protrusion 30 overlaps from the base part to the tip end of the first comb-teeth movable electrode 22*a* and/or the second comb-teeth movable electrode 22*b* and from the base part to the tip end of the first comb-teeth fixed electrode 12*a* and/or the second comb-teeth fixed electrode 12*b* in a plan view. Therefore, even when an excessive acceleration is applied to the inertial sensor 100, the occurrence of cracks or chips can be suppressed or avoided in the first comb-teeth movable electrode 22*a*, the second comb-teeth movable electrode 12*b*, the first comb-teeth fixed electrode 12*a*, and/or the second comb-teeth fixed electrode 12*b*.

The inertial sensor 100 according to the present embodiment further includes the beam 27 as the spring that holds the movable frame 21, and the fixing area 25 that fixes the movable frame 21 to the support substrate 1 via the beam 27, in which the movable frame 21 has the first extension 21*a* that has one end coupled to one end of the beam 27, the second extension 21*b* that has one end coupled to the other end of the beam 27, and the coupler 21*c* that couples the other end of the first extension 21*a* to the other end of the second extension 21*b*, and the first comb-teeth movable electrode 22*a* and the second comb-teeth movable electrode 22*b* are provided in the coupler 21*c*.

As described above, the first comb-teeth movable electrode 22*a* and the second comb-teeth movable electrode 22*b* are provided in the coupler 21*c* of the movable frame 21. Therefore, even when an excessive acceleration is applied to the inertial sensor 100, the occurrence of cracks or chips can be suppressed or avoided in the first comb-teeth movable electrode 22*a* and/or the second comb-teeth movable electrode 22*b*.

2. Embodiment 2

A schematic configuration of an inertial sensor 200 according to Embodiment 2 will be described with reference to FIGS. 5 and 6.

Figure 5:
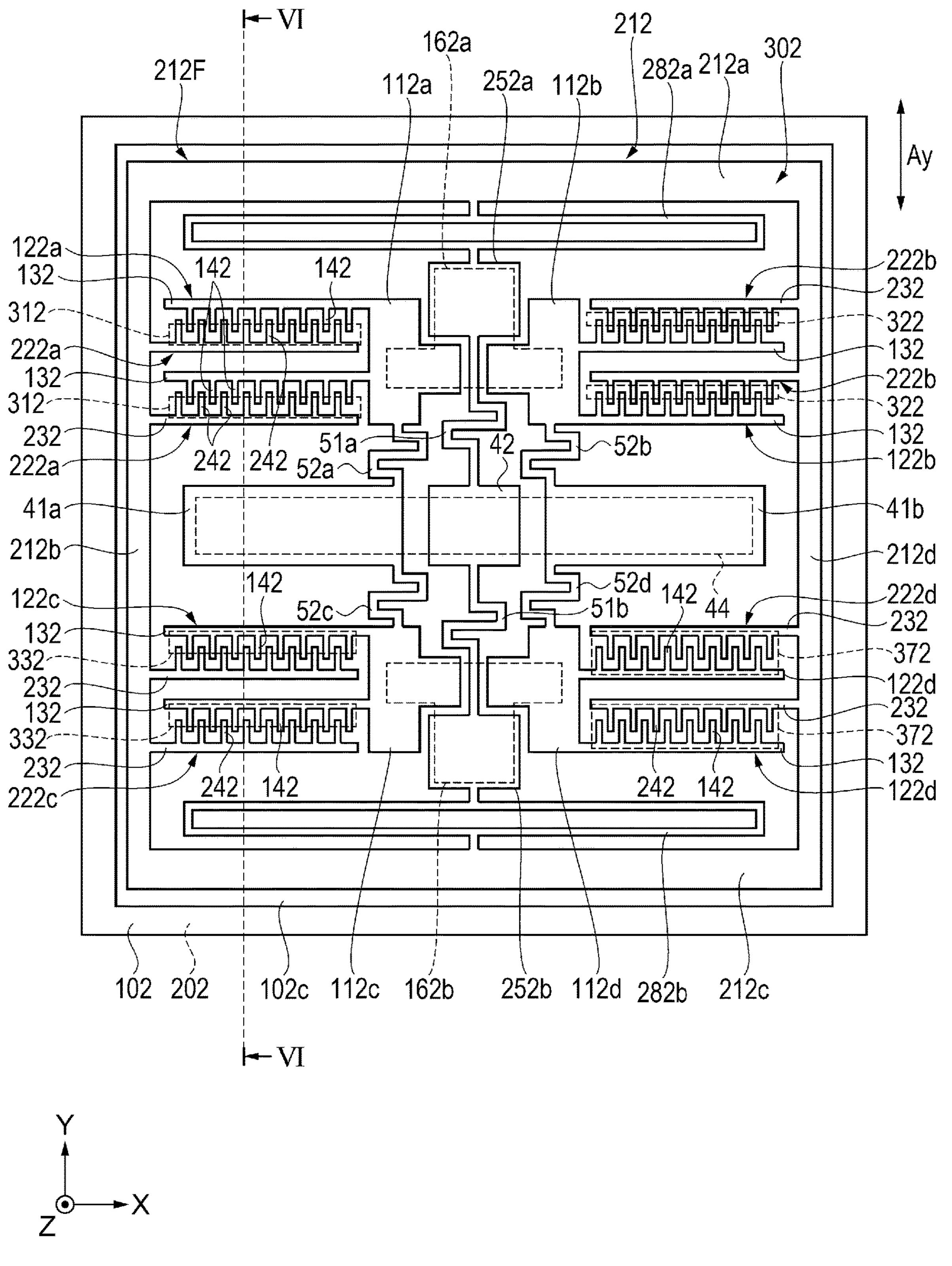
FIG. 5 is a plan view of an inertial sensor according to Embodiment 2.

FIG. 5 is a plan view schematically illustrating an inertial sensor 200 according to Embodiment 2. FIG. 6 is a cross-sectional view taken along the line VI-VI in FIG. 5. In FIG. 5, a lid 202 is made transparent for convenience of description.

The inertial sensor 200 is a physical amount sensor that detects a change in physical amount due to displacement of a rectangular frame-shaped movable frame 212 as a change in capacitance. In the present embodiment, the inertial sensor 200 is an acceleration sensor that measures an acceleration in the Y-axis direction based on the displacement of the movable frame 212.

Figure 6:
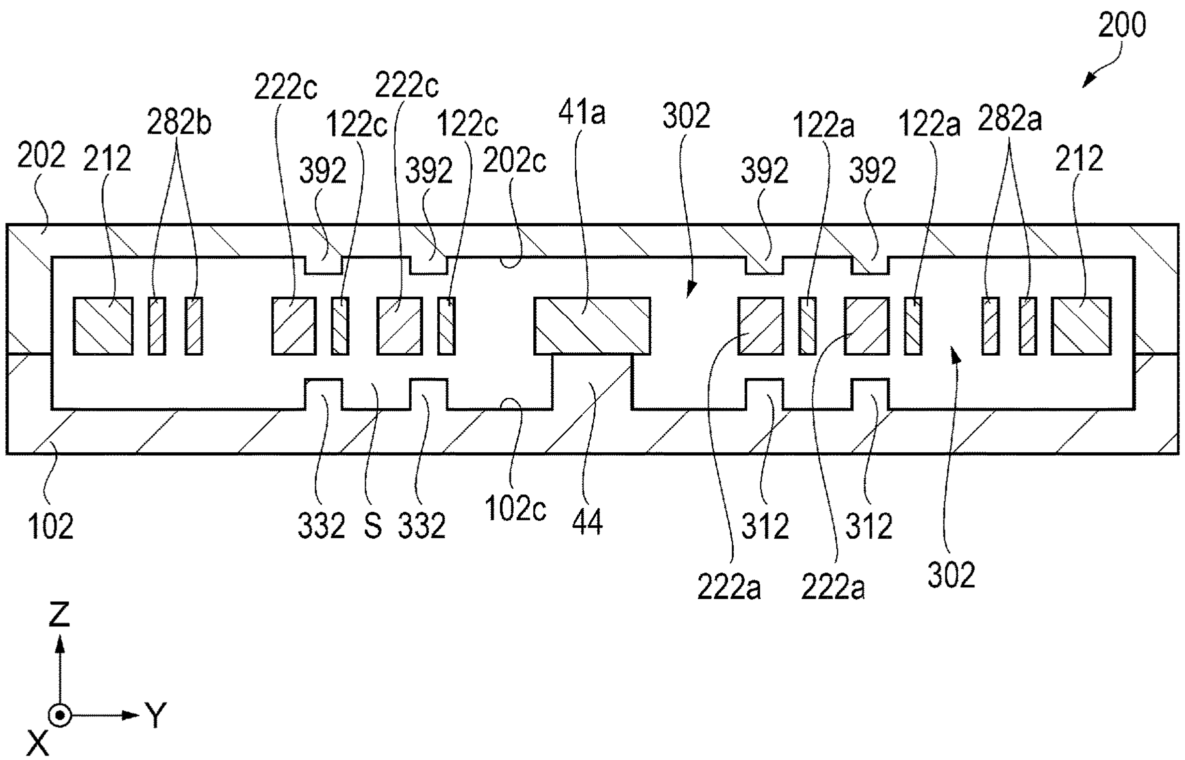
FIG. 6 is a cross-sectional view of the inertial sensor taken along the line VI-VI in FIG. 5.

As illustrated in FIG. 6, the inertial sensor 200 has a support substrate 102, a lid 202 bonded to the support substrate 102, and an element 302 provided between the support substrate 102 and the lid 202.

2.1. Support Substrate

The support substrate 102 has a cavity 102*c* including a recess, and a first mount 162*a*, a second mount 162*b*, a mount 44, and protrusions 312, 322, 332, and 372 are provided in the cavity 102*c*.

In the present embodiment, the support substrate 102 is made of a silicon substrate and can be formed by patterning the silicon substrate. A glass substrate or a ceramic substrate can also be used for the support substrate 102.

2.2. Lid

The lid 202 has a cavity 202*c* including a recess, and a protrusion 392 is provided in the cavity 202*c*.

In the present embodiment, the lid 202 is made of a glass substrate and can be formed by patterning the glass substrate. A silicon substrate or a ceramic substrate can also be used for the lid 202.

2.3. Element

The element 302 is provided in an accommodation space S including the cavity 102*c* and the cavity 202*c*.

The element 302 is made of, for example, a silicon substrate doped with impurities, such as phosphorus or boron, and can be formed by patterning the silicon substrate.

The element 302 includes a movable electrode and a fixed electrode.

2.3.1. Movable Electrode

The movable electrode includes the movable frame 212, a first comb-teeth movable electrode 222*a*, a second comb-teeth movable electrode 222*b*, a third comb-teeth movable electrode 222*c*, a fourth comb-teeth movable electrode 222*d*, a first spring 282*a*, a second spring 282*b*, a first fixing area 252*a*, a second fixing area 252*b*, a conductor 42, and wirings 51*a* and 51*b*. These portions are integrally formed and electrically coupled to each other.

The conductor 42 is bonded to the upper surface of the mount 44. The first fixing area 252*a* is bonded to the upper surface of the first mount 162*a*. The second fixing area 252*b* is bonded to the upper surface of the second mount 162*b*.

The movable frame 212 is held swingably along the Y-axis direction by the first spring 282*a* and the second spring 282*b*. The movable frame 212 has a quadrangular border 212F in a plan view.

The border 212F includes a first side 212*a*, a second side 212*b*, a third side 212*c*, and a fourth side 212*d*. The first spring 282*a* is provided between the first side 212*a* and the first fixing area 252*a* of the border 212F. Further, the second spring 282*b* is provided between the third side 212*c* and the second fixing area 252*b* of the border 212F.

Each of the first comb-teeth movable electrode 222*a*, the second comb-teeth movable electrode 222*b*, the third comb-teeth movable electrode 222*c*, and the fourth comb-teeth movable electrode 222*d* has a movable electrode arm 232 and a movable electrode finger 242.

In the first comb-teeth movable electrode 222*a*, the movable electrode arm 232 is provided to extend from the second side 212*b* of the border 212F toward the + side of the X-axis direction. Further, the movable electrode finger 242 is provided to extend from the movable electrode arm 232 toward the + side in the Y-axis direction.

In the second comb-teeth movable electrode 222*b*, the movable electrode arm 232 is provided to extend from the fourth side 212*d* of the border 212F toward the − side in the X-axis direction. Further, the movable electrode finger 242 is provided to extend from the movable electrode arm 232 toward the − side in the Y-axis direction.

In the third comb-teeth movable electrode 222*c*, the movable electrode arm 232 is provided to extend from the second side 212*b* of the border 212F toward the + side in the X-axis direction. Further, the movable electrode finger 242 is provided to extend from the movable electrode arm 232 toward the + side in the Y-axis direction.

In the fourth comb-teeth movable electrode 222*d*, the movable electrode arm 232 is provided to extend from the fourth side 212*d* of the border 212F toward the − side in the X-axis direction. Further, the movable electrode finger 242 is provided to extend from the movable electrode arm 232 toward the − side in the Y-axis direction.

2.3.2. Fixed Electrode

The fixed electrode includes a first fixed frame 112*a*, a second fixed frame 112*b*, a third fixed frame 112*c*, a fourth fixed frame 112*d*, a first comb-teeth fixed electrode 122*a*, a second comb-teeth fixed electrode 122*b*, a third comb-teeth fixed electrode 122*c*, a fourth comb-teeth fixed electrode 122*d*, conductors 41*a* and 41*b*, and wirings 52*a*, 52*b*, 52*c*, and 52*d*.

The conductors 41*a* and 41*b* are bonded to the upper surface of the mount 44. The first fixed frame 112*a* and the second fixed frame 112*b* are bonded to the upper surface of the first mount 162*a*. The third fixed frame 112*c* and the fourth fixed frame 112*d* are bonded to the upper surface of the second mount 162*b*.

Each of the first comb-teeth fixed electrode 122*a*, the second comb-teeth fixed electrode 122*b*, the third comb-teeth fixed electrode 122*c*, and the fourth comb-teeth fixed electrode 122*d* has a fixed electrode arm 132 and a fixed electrode finger 142.

The fixed electrode arm 132 of the first comb-teeth fixed electrode 122*a* faces the movable electrode arm 232 of the first comb-teeth movable electrode 222*a* with a predetermined gap in the Y-axis direction. Further, in the first comb-teeth fixed electrode 122*a*, the fixed electrode finger 142 provided on the fixed electrode arm 132 faces the movable electrode finger 242 of the first comb-teeth movable electrode 222*a* with a predetermined gap in the X-axis direction.

The fixed electrode arm 132 of the second comb-teeth fixed electrode 122*b* faces the movable electrode arm 232 of the second comb-teeth movable electrode 222*b* with a predetermined gap in the Y-axis direction. Further, in the second comb-teeth fixed electrode 122*b*, the fixed electrode finger 142 provided on the fixed electrode arm 132 faces the movable electrode finger 242 of the second comb-teeth movable electrode 222*b* with a predetermined gap in the X-axis direction.

The fixed electrode arm 132 of the third comb-teeth fixed electrode 122*c* faces the movable electrode arm 232 of the third comb-teeth movable electrode 222*c* with a predetermined gap in the Y-axis direction. Further, in the third comb-teeth fixed electrode 122*c*, the fixed electrode finger 142 provided on the fixed electrode arm 132 faces the movable electrode finger 242 of the third comb-teeth movable electrode 222*c* with a predetermined gap in the X-axis direction.

The fixed electrode arm 132 of the fourth comb-teeth fixed electrode 122*d* faces the movable electrode arm 232 of the fourth comb-teeth movable electrode 222*d* with a predetermined gap in the Y-axis direction. Further, in the fourth comb-teeth fixed electrode 122*d*, the fixed electrode finger 142 provided on the fixed electrode arm 132 faces the movable electrode finger 242 of the fourth comb-teeth movable electrode 222*d* with a predetermined gap in the X-axis direction.

2.3.3. Protrusion

The support substrate 102 has protrusions 312, 322, 332, and 372. Further, the lid 202 has the protrusion 392. Although not illustrated, the plan shape of the protrusion 392 is substantially the same as the protrusions 312, 322, 332, and 372 facing in the Z-axis direction.

All the protrusions 312, 322, 332, 372, and 392 are stoppers for suppressing the significant vibration of the first comb-teeth movable electrode 222*a*, the second comb-teeth movable electrode 222*b*, the third comb-teeth movable electrode 222*c*, the fourth comb-teeth movable electrode 222*d*, the first comb-teeth fixed electrode 122*a*, the second comb-teeth fixed electrode 122*b*, the third comb-teeth fixed electrode 122*c*, and/or the fourth comb-teeth fixed electrode 122*d*.

In order to cause the protrusions 312, 322, 332, 372, and 392 to function as the stoppers, the protrusions 312, 322, 332, 372, and 392 are disposed at positions overlapping the first comb-teeth movable electrode 222*a*, the second comb-teeth movable electrode 222*b*, the third comb-teeth movable electrode 222*c*, the fourth comb-teeth movable electrode 222*d*, the first comb-teeth fixed electrode 122*a*, the second comb-teeth fixed electrode 122*b*, the third comb-teeth fixed electrode 122*c*, and/or the fourth comb-teeth fixed electrode 122*d* in a plan view.

In the present embodiment, the disposition positions of the protrusions 312, 322, 332, and 372 are different from each other to explain the variations in the disposition positions. However, all the disposition positions of the protrusions 312, 322, 332, and 372 may be the same or some of them are the same and the other may be different.

The protrusion 312 and the protrusion 392 facing the protrusion 312 overlap the first comb-teeth movable electrode 222*a* and the first comb-teeth fixed electrode 122*a* in a plan view. The protrusion 312 and the protrusion 392 facing the protrusion 312 overlap the base part of the movable electrode finger 242 of the first comb-teeth movable electrode 222*a* and the tip end of the fixed electrode finger 142 of the first comb-teeth fixed electrode 122*a* in a plan view.

The protrusion 322 and the protrusion 392 facing the protrusion 322 overlap the second comb-teeth movable electrode 222*b* and the second comb-teeth fixed electrode 122*b* in a plan view. The protrusion 322 and the protrusion 392 facing the protrusion 322 overlap the base part of the movable electrode finger 242 of the second comb-teeth movable electrode 222*b* and the tip end of the fixed electrode finger 142 of the second comb-teeth fixed electrode 122*b* in a plan view.

The protrusion 332 and the protrusion 392 facing the protrusion 332 overlap the third comb-teeth movable electrode 222*c* and the third comb-teeth fixed electrode 122*c* in a plan view. The protrusion 332 and the protrusion 392 facing the protrusion 332 overlap the tip end of the movable electrode finger 242 of the third comb-teeth movable electrode 222*c* and the base part of the fixed electrode finger 142 of the third comb-teeth fixed electrode 122*c* and the joint part of the fixed electrode finger 142 and the fixed electrode arm 132 in a plan view.

The protrusion 372 and the protrusion 392 facing the protrusion 372 overlap the fourth comb-teeth movable electrode 222*d* and the fourth comb-teeth fixed electrode 122*d* in a plan view. The protrusion 372 and the protrusion 392 facing the protrusion 372 overlap from the joint part of the movable electrode finger 242 and the movable electrode arm 232 of the fourth comb-teeth movable electrode 222*d* to the joint part of the fixed electrode finger 142 and the fixed electrode arm 132 of the fourth comb-teeth fixed electrode 122*d* in a plan view.

In the present embodiment, the protrusions 312, 322, 332, 372, and the protrusion 392 are disposed at overlapping positions in a plan view, but the protrusions 312, 322, 332, and 372 and the protrusion 392 may be disposed at positions not overlapping each other in a plan view.

Further, instead of the protrusions 312, 322, 332, 372, and 392, protrusions illustrated in other embodiments may be adopted.

When an excessive acceleration is applied to the inertial sensor 200, the first comb-teeth movable electrode 222*a*, the second comb-teeth movable electrode 222*b*, the third comb-teeth movable electrode 222*c*, the fourth comb-teeth movable electrode 222*d*, the first comb-teeth fixed electrode 122*a*, the second comb-teeth fixed electrode 122*b*, the third comb-teeth fixed electrode 122*c*, and the fourth comb-teeth fixed electrode 122*d* come into contact with the protrusion 312, the protrusion 322, the protrusion 332, the protrusion 372 or the protrusion 392 before the vibration width in the Z-axis direction becomes excessively large.

In the present embodiment, the movable electrode arm 232, the movable electrode finger 242, the fixed electrode arm 132, or the fixed electrode finger 142 comes into contact with the protrusion 312, the protrusion 322, the protrusion 332, the protrusion 372, or the protrusion 392.

In other words, the movable electrode arm 232, the movable electrode finger 242, the fixed electrode arm 132, and/or the fixed electrode finger 142 is limited by the protrusion 312, the protrusion 322, the protrusion 332, the protrusion 372, or the protrusion 392 so that the vibration width does not become excessively large.

Therefore, the inertial sensor 200 according to the present embodiment includes the protrusion 312, the protrusion 322, the protrusion 332, the protrusion 372, and/or the protrusion 392. Therefore, even when an excessive acceleration is applied to the inertial sensor 200, the occurrence of cracks or chips can be suppressed or avoided in the movable electrode arm 232, the movable electrode finger 242, the fixed electrode arm 132, and/or the fixed electrode finger 142.

Further, when the protrusion 312, the protrusion 322, the protrusion 332, and/or the protrusion 372 suppresses the movable electrode arm 232, the movable electrode finger 242, the fixed electrode arm 132, and/or the fixed electrode finger 142 from coming into contact with or colliding with the bottom surface of the cavity 102*c*. Further, the protrusion 392 suppresses the movable electrode arm 232, the movable electrode finger 242, the fixed electrode arm 132, and/or the fixed electrode finger 142 from coming into contact with or colliding with the bottom surface of the cavity 202*c*.

In other words, the movable electrode arm 232, the movable electrode finger 242, the fixed electrode arm 132, and/or the fixed electrode finger 142 is protected so as not to come into contact with or collide with the bottom surface of the cavity 102*c* by the protrusion 312, the protrusion 322, the protrusion 332, and/or the protrusion 372. Further, the movable electrode arm 232, the movable electrode finger 242, the fixed electrode arm 132, and/or the fixed electrode finger 142 is protected so as not to come into contact with or collide with the bottom surface of the cavity 202*c* by the protrusion 392.

Therefore, the inertial sensor 200 according to the present embodiment includes the protrusion 312, the protrusion 322, the protrusion 332, the protrusion 372, and/or the protrusion 392. Therefore, even when an excessive acceleration is applied to the inertial sensor 200, the occurrence of cracks or chips can be suppressed in the movable electrode arm 232, the movable electrode finger 242, the fixed electrode arm 132, and/or the fixed electrode finger 142.

Further, the protrusion 312, the protrusion 322, the protrusion 332, the protrusion 372, and/or the protrusion 392 has an effect of suppressing the movable electrode arm 232, the movable electrode finger 242, the fixed electrode arm 132, and/or the fixed electrode finger 142 from adhering to the support substrate 102 or the lid 202.

2.3.4. Detector

A detector includes a first detector having the first comb-teeth movable electrode 222*a* and the first comb-teeth fixed electrode 122*a*, and a second detector having the second comb-teeth movable electrode 222*b* and the second comb-teeth fixed electrode 122*b*, a third detector having the third comb-teeth movable electrode 222*c* and the third comb-teeth fixed electrode 122*c*, and a fourth detector having the fourth comb-teeth movable electrode 222*d* and the fourth comb-teeth fixed electrode 122*d*.

Each of the first detector, the second detector, the third detector, and the fourth detector detects the acceleration in the Y-axis direction.

In the inertial sensor 200, when an acceleration on the − side in the Y-axis direction occurs, the gap between the movable electrode arm 232 and the fixed electrode arm 132 decreases and the facing area between the movable electrode finger 242 and the fixed electrode finger 142 increases in the first detector and the third detector, and the gap between the movable electrode arm 232 and the fixed electrode arm 132 increases and the facing area between the movable electrode finger 242 and the fixed electrode finger 142 is reduced in the second detector and the fourth detector.

Further, when the acceleration on the + side in the Y-axis direction occurs, the gap between the movable electrode arm 232 and the fixed electrode arm 132 increases and the facing area between the movable electrode finger 242 and the fixed electrode finger 142 is reduced in the first detector and the third detector, and the gap between the movable electrode arm 232 and the fixed electrode arm 132 decreases and the facing area between the movable electrode finger 242 and the fixed electrode finger 142 increases in the second detector and the fourth detector.

Therefore, the inertial sensor 200 according to the present embodiment can detect the acceleration on the + side in the Y-axis direction and the acceleration on the − side in the Y-axis direction by detecting the increase or reduction in the facing areas in the first detector and the third detector and the reduction or increase in the facing areas between the second detector and the fourth detector, as the change in capacitance. In addition, the acceleration on the + side in the Y-axis direction and the acceleration on the − side in the Y-axis direction can be detected by detecting reduction or expansion of the gap between the first detector and the third detector and expansion or reduction of the gap between the second detector and the fourth detector, as the change in capacitance.

2.3.5. Others

In the present embodiment, description is made such that the first comb-teeth movable electrode 222*a*, the second comb-teeth movable electrode 222*b*, the third comb-teeth movable electrode 222*c*, and the fourth comb-teeth movable electrode 222*d* include the movable electrode arm 232 and the movable electrode finger 242, and the first comb-teeth fixed electrode 122*a*, the second comb-teeth fixed electrode 122*b*, the third comb-teeth fixed electrode 122*c*, and the fourth comb-teeth fixed electrode 122*d* include the fixed electrode arm 132 and the fixed electrode finger 142.

However, it may be read that the movable electrode arm 232 is included in the movable frame 212, and only the movable electrode finger 242 corresponds to the first comb-teeth movable electrode 222*a*, the second comb-teeth movable electrode 222*b*, the third comb-teeth movable electrode 222*c*, and the fourth comb-teeth movable electrode 222*d*. Further, it may be read that the fixed electrode arm 132 is included in the first fixed frame 112*a*, the second fixed frame 112*b*, the third fixed frame 112*c*, and the fourth fixed frame 112*d*, and only the fixed electrode finger 142 corresponds to the first comb-teeth fixed electrode. 122*a*, the second comb-teeth fixed electrode 122*b*, the third comb-teeth fixed electrode 122*c*, and the fourth comb-teeth fixed electrode 122*d*.

By being read in this way, in the present embodiment, the disposition relationship between each protrusion and each electrode can be considered to be the same as the disposition in Embodiment 1.

That is, in the present embodiment, the joint part is a part at which the movable electrode finger 242 is coupled to the movable electrode arm 232. More specifically, when a joint is an end of the movable electrode finger 242 on the fixed end side, the joint part includes the joint and the peripheral part thereof. Further, in the present embodiment, the tip end is an end of the movable electrode finger 242 on the free end side, and the base part is a part close to the joint of the movable electrode finger 242 in the movable electrode finger 242. Further, the joint part is a part at which the fixed electrode finger 142 is coupled to the fixed electrode arm 132. More specifically, when a joint is an end of the fixed electrode finger 142 on the fixed end side, the joint part includes the joint and the peripheral part thereof. Further, in the present embodiment, the tip end is an end of the fixed electrode finger 142 on the free end side, and the base part is, for example, a part close to the joint of the fixed electrode finger 142 in the fixed electrode finger 142.

Hereinbefore, as described above, according to the inertial sensor 200 according to the present embodiment, the following effects can be obtained.

The inertial sensor 200 according to the present embodiment includes the support substrate 102, the lid 202 provided to face the support substrate 102, the movable frame 212 provided between the support substrate 102 and the lid 202, the first comb-teeth movable electrode 222*a*, the second comb-teeth movable electrode 222*b*, the third comb-teeth movable electrode 222*c*, or the fourth comb-teeth movable electrode 222*d* provided in the movable frame 212, and the protrusion 312, the protrusion 322, the protrusion 332, or the protrusion 372 provided at least one of the support substrate 102 or the lid 202 and overlapping the tip end or base part of the first comb-teeth movable electrode 222*a*, the second comb-teeth movable electrode 222*b*, the third comb-teeth movable electrode 222*c*, or the fourth comb-teeth movable electrode 222*d* in a plan view.

As described above, the protrusion 312, the protrusion 322, the protrusion 332, or the protrusion 372 are included which overlaps the tip end or the base part of the first comb-teeth movable electrode 222*a*, the second comb-teeth movable electrode 222*b*, the third comb-teeth movable electrode 222*c*, or the fourth comb-teeth movable electrode 222*d* in a plan view. Therefore, even when an excessive acceleration is applied to the inertial sensor 200, the occurrence of cracks or chips can be suppressed or avoided in the first comb-teeth movable electrode 222*a*, the second comb-teeth movable electrode 222*b*, the third comb-teeth movable electrode 222*c* or the fourth comb-teeth movable electrode 222*d*.

Therefore, a highly reliable inertial sensor 200 can be realized by suppressing the occurrence of cracks or chips in the MEMS structure that causes a failure.

The inertial sensor 200 according to the present embodiment further includes the first fixed frame 112*a* provided between the support substrate 102 and the lid 202, and the first comb-teeth fixed electrode 122*a* provided in the first fixed frame 112*a*, in which the protrusion 312 overlaps the first comb-teeth fixed electrode 122*a* in a plan view.

As described above, the protrusion 312 overlaps the first comb-teeth fixed electrode 122*a* in a plan view. Therefore, even when an excessive acceleration is applied to the inertial sensor 200, the occurrence of cracks or chips can be suppressed or avoided in the first comb-teeth fixed electrode 122*a* or the first fixed frame 112*a*.

Further, in the inertial sensor 200 according to the present embodiment, the first comb-teeth movable electrode 222*a*, the second comb-teeth movable electrode 222*b*, the third comb-teeth movable electrode 222*c*, and the fourth comb-teeth movable electrode 222*d* include the movable electrode arm 232 extending in the first direction, and the movable electrode finger 242 extending, from the movable electrode arm 232, in the Y-axis direction as the second direction intersecting the X-axis direction as the first direction, in which the protrusion 312 is provided along the X-axis direction.

As described above, the extending direction of the movable electrode arm 232 is the same as the extending direction of the protrusion 312. Therefore, the occurrence of cracks or chips can be suppressed or avoided in the movable electrode arm 232 and/or the movable electrode finger 242.

In the inertial sensor 200 according to the present embodiment, the protrusion 312 overlaps the joint part of the movable electrode arm 232 and the movable electrode finger 242 in a plan view.

As described above, the protrusion 312 overlaps the joint part of the movable electrode arm 232 and the movable electrode finger 242 in a plan view. Therefore, the occurrence of cracks or chips can be suppressed or avoided in the movable electrode arm 232 and/or the movable electrode finger 242.

In the inertial sensor 200 according to the present embodiment, the protrusion 322 overlaps the base part of the movable electrode finger 242 in a plan view.

As described above, the protrusion 322 overlaps the base part of the movable electrode finger 242 in a plan view. Therefore, the occurrence of cracks or chips can be suppressed or avoided in the movable electrode finger 242.

In the inertial sensor 200 according to the present embodiment, the protrusion 332 overlaps the tip end of the movable electrode finger 242 in a plan view.

As described above, the protrusion 332 overlaps the tip end of the movable electrode finger 242 in a plan view. Therefore, the occurrence of cracks or chips can be suppressed or avoided in the movable electrode finger 242.

The inertial sensor 200 according to the present embodiment includes the fourth fixed frame 112*d* provided between the support substrate 102 and the lid 202, and the fourth comb-teeth fixed electrode 122*d* provided in the fourth fixed frame 112*d*, in which the fourth comb-teeth fixed electrode 122*d* has a fixed electrode arm 132 facing the movable electrode arm 232, and a fixed electrode finger 142 extending from the fixed electrode arm 132 in the Y-axis direction as the second direction, and the protrusion 372 overlaps from the base part to the tip end of the movable electrode finger 242 and the base part to the tip end of the fixed electrode finger 142 in a plan view.

As described above, the protrusion 372 overlaps from the base part to the tip end of the movable electrode finger 242 and from the base part to the tip end of the fixed electrode finger 142 in a plan view. Therefore, the occurrence of cracks or chips can be suppressed or avoided in the movable electrode finger 242 and/or the fixed electrode finger 142.

The inertial sensor 200 according to the present embodiment further includes the first spring 282*a* that holds the movable frame 212, and the first fixing area 252*a* that fixes the movable frame 212 to the support substrate 102 via the first spring 282*a*, in which the movable frame 212 has the border 212F that surrounds the first comb-teeth movable electrode 222*a*, the first spring 282*a* is coupled to the first side 212*a* of the border 212F, and the first comb-teeth movable electrode 222*a* is provided on the second side 212*b* that intersects the first side 212*a*.

As described above, the first comb-teeth movable electrode 222*a* is provided in the movable frame 212. Therefore, even when an excessive acceleration is applied to the inertial sensor 200, the occurrence of cracks or chips can be suppressed or avoided in the first comb-teeth movable electrode 222*a*.

3. Embodiment 3

A schematic configuration of an inertial sensor 300 according to Embodiment 3 will be described with reference to FIGS. 7 and 8.

Figure 7:
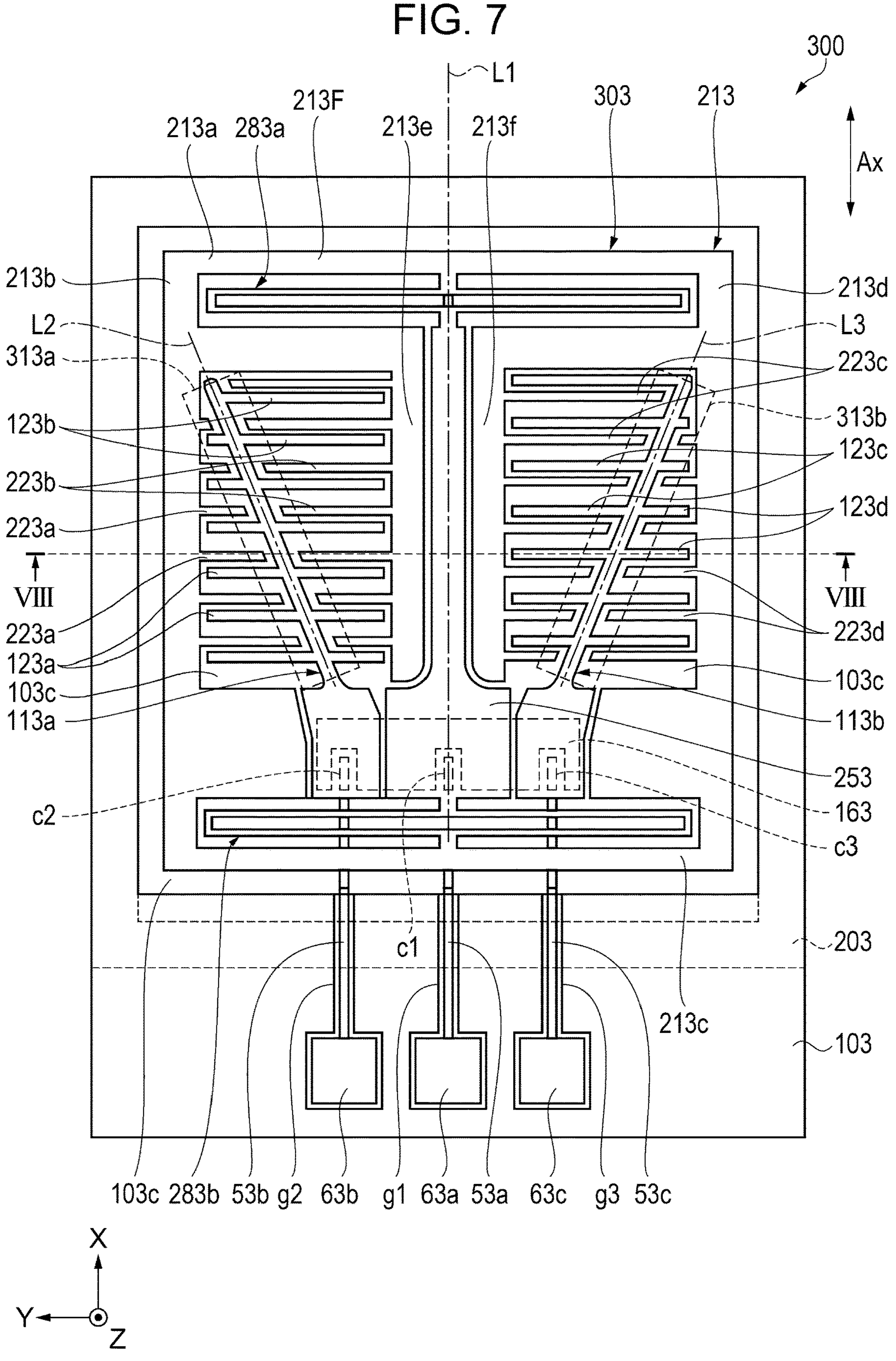
FIG. 7 is a plan view of an inertial sensor according to Embodiment 3.

FIG. 7 is a plan view schematically illustrating the inertial sensor 300 according to Embodiment 3. FIG. 8 is a cross-sectional view taken along the line VIII-VIII in FIG. 7. In FIG. 7, a lid 203 is made transparent for convenience of description.

The inertial sensor 300 is a physical amount sensor that detects a change in physical amount due to the displacement of a frame-shaped movable frame 213 as a change in capacitance. In the present embodiment, the inertial sensor 300 is an acceleration sensor that measures an acceleration in the X-axis direction based on the displacement of the movable frame 213.

Figure 8:
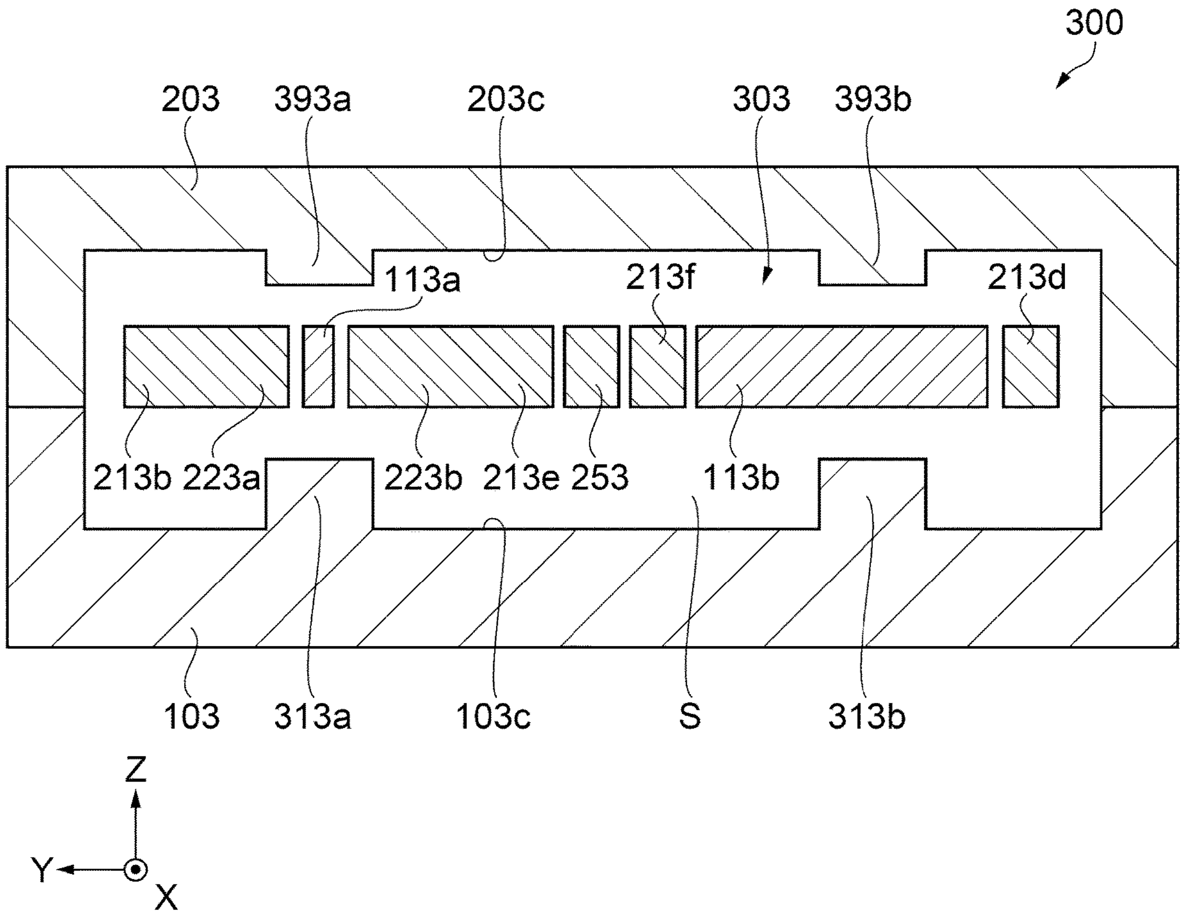
FIG. 8 is a cross-sectional view of an inertial sensor taken along the line VIII-VIII in FIG. 7.

As illustrated in FIG. 8, the inertial sensor 300 includes a support substrate 103, a lid 203 bonded to the support substrate 103, and an element 303 provided between the support substrate 103 and the lid 203.

3.1. Support Substrate

The support substrate 103 has a cavity 103*c* including a recess, and a mount 163 and protrusions 313*a* and 313*b* are provided in the cavity 103*c*.

In the present embodiment, the support substrate 103 is made of a silicon substrate and can be formed by patterning the silicon substrate. A glass substrate or a ceramic substrate can also be used for the support substrate 103.

3.2. Lid

The lid 203 has a cavity 203*c* including a recess, and protrusions 393*a* and 393*b* are provided in the cavity 203*c*.

In the present embodiment, the lid 203 is made of a glass substrate and can be formed by patterning the glass substrate. A silicon substrate or a ceramic substrate can also be used for the lid 203.

3.3. Element

The element 303 is provided in an accommodation space S including the cavity 103*c* and the cavity 203*c*.

The element 303 is made of, for example, a silicon substrate doped with impurities, such as phosphorus and boron, and can be formed by patterning the silicon substrate.

The element 303 includes a movable electrode and a fixed electrode.

3.3.1. Movable Electrode

The movable electrode includes the movable frame 213, a first comb-teeth movable electrode 223*a*, a second comb-teeth movable electrode 223*b*, a third comb-teeth movable electrode 223*c*, a fourth comb-teeth movable electrode 223*d*, a first spring 283*a*, a second spring 283*b*, and a fixing area 253. These portions are integrally formed and electrically coupled to each other.

The fixing area 253 is bonded to the upper surface of the mount 163. The fixing area 253 has a part that extends from the mount 163 along a center line L1.

The movable frame 213 and the fixing area 253 are coupled to each other via the first spring 283*a* and the second spring 283*b*. Accordingly, the movable frame 213 is provided to be swingable in the X-axis direction.

The movable frame 213 has a quadrangular border 213F in a plan view.

The border 213F includes a first side 213*a*, a second side 213*b*, a third side 213*c*, a fourth side 213*d*, a first extension 213*e*, and a second extension 213*f*.

The first spring 283*a* is provided between the first side 213*a* of the border 213F and the fixing area 253. Further, the second spring 283*b* is provided between the third side 213*c* of the border 213F and the fixing area 253.

A plurality of first comb-teeth movable electrodes 223*a* is provided on the second side 213*b* of the border 213F. Each of the plurality of first comb-teeth movable electrodes 223*a* is provided to extend from the second side 213*b* toward the − side in the Y-axis direction. The length of each of the plurality of first comb-teeth movable electrodes 223*a* in the Y-axis direction gradually decreases toward the + side in the X-axis direction.

A plurality of second comb-teeth movable electrodes 223*b* are provided on the first extension 213*e* of the border 213F. Each of the plurality of second comb-teeth movable electrodes 223*b* is provided to extend from the first extension 213*e* toward the + side in the Y-axis direction. The length of each of the plurality of second comb-teeth movable electrodes 223*b* in the Y-axis direction gradually increases toward the + side in the X-axis direction.

A plurality of third comb-teeth movable electrodes 223*c* is provided on the second extension 213*f* of the border 213F. Each of the plurality of third comb-teeth movable electrodes 223*c* is provided to extend from the second extension 213*f* toward the − side in the Y-axis direction. The length of each of the plurality of third comb-teeth movable electrodes 223*c* in the Y-axis direction gradually increases toward the + side in the X-axis direction.

A plurality of fourth comb-teeth movable electrodes 223*d* is provided on the fourth side 213*d* of the border 213F. Each of the plurality of fourth comb-teeth movable electrodes 223*d* is provided to extend from the fourth side 213*d* toward the + side in the Y-axis direction. The length of each of the plurality of fourth comb-teeth movable electrodes 223*d* in the Y-axis direction gradually decreases toward the + side in the X-axis direction.

3.3.2. Fixed Electrode

The fixed electrode includes a first fixed frame 113*a*, a second fixed frame 113*b*, a first comb-teeth fixed electrode 123*a*, a second comb-teeth fixed electrode 123*b*, a third comb-teeth fixed electrode 123*c*, and a fourth comb-teeth fixed electrode 123*d*.

Each of one ends of the first fixed frame 113*a* and the second fixed frame 113*b* is bonded to the upper surface of the mount 163.

Each of the other ends of the first fixed frame 113*a* and the second fixed frame 113*b* has an elongated rod shape. The other ends of the first fixed frame 113*a* and the second fixed frame 113*b* extend in a direction inclined with respect to the X axis and the Y axis, respectively, in a plan view.

Specifically, the center line L2 of the first fixed frame 113*a* and the center line L3 of the second fixed frame 113*b* are inclined toward the tip end side thereof so that the separation distance from the center line L1 increases. Although the inclination of the first fixed frame 113*a* and the second fixed frame 113*b* with respect to the center line L1 is not particularly limited, the inclination is preferably 10° or more and 45° or less, and more preferably 10° or more and 30° or less. Thereby, the first comb-teeth fixed electrode 123*a*, the second comb-teeth fixed electrode 123*b*, the third comb-teeth fixed electrode 123*c*, and the fourth comb-teeth fixed electrode 123*d* can be suppressed from extending in the Y-axis direction, so that the size of the element 303 can be reduced.

The first comb-teeth fixed electrode 123*a* extends from the first fixed frame 113*a* to the + side in the Y-axis direction. Further, the first comb-teeth fixed electrode 123*a* faces the first comb-teeth movable electrode 223*a* with a predetermined gap.

The second comb-teeth fixed electrode 123*b* extends from the first fixed frame 113*a* to the − side in the Y-axis direction. Further, the second comb-teeth fixed electrode 123*b* faces the second comb-teeth movable electrode 223*b* with a predetermined gap.

The third comb-teeth fixed electrode 123*c* extends from the second fixed frame 113*b* to the + side in the Y-axis direction. Further, the third comb-teeth fixed electrode 123*c* faces the third comb-teeth movable electrode 223*c* with a predetermined gap.

The fourth comb-teeth fixed electrode 123*d* extends from the second fixed frame 113*b* to the − side in the Y-axis direction. Further, the fourth comb-teeth fixed electrode 123*d* faces the fourth comb-teeth movable electrode 223*d* with a predetermined gap.

The first comb-teeth fixed electrode 123*a* and the second comb-teeth fixed electrode 123*b* are electrically coupled to an electrode pad 63*b* via the first fixed frame 113*a*, a contact portion c2, and wiring 53*b* provided in a groove g2.

The third comb-teeth fixed electrode 123*c* and the fourth comb-teeth fixed electrode 123*d* are electrically coupled to an electrode pad 63*c* via the second fixed frame 113*b*, a contact portion c3, and wiring 53*c* provided in a groove g3.

The first comb-teeth movable electrode 223*a*, the second comb-teeth movable electrode 223*b*, the third comb-teeth movable electrode 223*c*, and the fourth comb-teeth movable electrode 223*d* are electrically coupled to the electrode pad 63*a* via the movable frame 213, the first spring 283*a*, the second spring 283*b*, the fixing area 253, the contact portion c1, and wiring 53*a* provided in the groove g1.

3.3.3. Protrusion

The support substrate 103 has the protrusions 313*a* and 313*b*. Further, the lid 203 includes protrusions 393*a* and 393*b*. Although not illustrated, the plan shapes of the protrusions 393*a* and 393*b* are substantially the same as the plan shapes of the protrusions 313*a* and 313*b* facing in the Z-axis direction.

All the protrusions 313*a*, 313*b*, 393*a*, and 393*b* are stoppers for suppressing the significant vibration of the first comb-teeth movable electrode 223*a*, the second comb-teeth movable electrode 223*b*, the third comb-teeth movable electrode 223*c*, the fourth comb-teeth movable electrode 223*d*, the first comb-teeth fixed electrode 123*a*, the second comb-teeth fixed electrode 123*b*, the third comb-teeth fixed electrode 122*c*, and/or the fourth comb-teeth fixed electrode 122*d*.

In order to cause the protrusions 313*a*, 313*b*, 393*a*, and 393*b* to function as the stoppers, the protrusion 313*a* and the protrusion 393*a* are disposed at positions overlapping the tip ends of the first comb-teeth movable electrode 223*a* and the second comb-teeth movable electrode 223*b* and the base parts and the joint part of the first comb-teeth fixed electrode 123*a* and the second comb-teeth fixed electrode 123*b* in a plan view. Further, the protrusion 313*b* and the protrusion 393*b* are disposed at positions overlapping the tip ends of the third comb-teeth movable electrode 223*c* and the fourth comb-teeth movable electrode 223*d* and the base parts and the joint part of the third comb-teeth fixed electrode 123*c* and the fourth comb-teeth fixed electrode 123*d* in a plan view.

In the present embodiment, the protrusion 313*a* and the protrusion 393*a* are disposed at positions overlapping each other in a plan view, but the protrusion 313*a* and the protrusion 393*a* may be disposed at positions not overlapping each other in a plan view. Further, the protrusion 313*b* and the protrusion 393*b* are disposed at positions overlapping each other in a plan view, but the protrusion 313*b* and the protrusion 393*b* may be disposed at positions not overlapping each other in a plan view.

Further, instead of the protrusions 313*a*, 313*b*, 393*a*, and 393*b*, protrusions illustrated in other embodiments may be adopted.

For example, the protrusion 313*a* and/or the protrusion 393*a* may be disposed at positions overlapping the base part and/or the joint part of the first comb-teeth movable electrode 223*a*.

Further, the protrusion 313*a* and/or the protrusion 393*a* may be disposed at positions overlapping the base part and/or the joint part of the second comb-teeth movable electrode 223*b*.

Further, the protrusion 313*b* and/or the protrusion 393*b* may be disposed at positions overlapping the base part and/or the joint part of the third comb-teeth movable electrode 223*c*.

Further, the protrusion 313*b* and/or the protrusion 393*b* may be disposed at positions overlapping the base part and/or the joint part of the fourth comb-teeth movable electrode 223*d*.

Further, the protrusions 313*a* and 393*a* may be disposed at positions overlapping from the joint part or the base part of the first comb-teeth movable electrode 223*a* to the joint part or the base part of the second comb-teeth movable electrode 223*b*.

Further, the protrusions 313*b* and 393*b* may be disposed at positions overlapping from the joint part or the base part of the third comb-teeth movable electrode 223*c* to the joint part or the base part of the fourth comb-teeth movable electrode 223*d*.

When an excessive acceleration is applied to the inertial sensor 300, the first comb-teeth movable electrode 223*a*, the second comb-teeth movable electrode 223*b*, the third comb-teeth movable electrode 223*c*, the fourth comb-teeth movable electrode 223*d*, the first comb-teeth fixed electrode 123*a*, the second comb-teeth fixed electrode 123*b*, the third comb-teeth fixed electrode 123*c*, or the fourth comb-teeth fixed electrode 123*d* comes into contact with the protrusion 313*a*, the protrusion 313*b*, the protrusion 393*a*, and/or the protrusion 393*b* before the vibration width in the Z-axis direction becomes excessively large.

Therefore, the inertial sensor 300 according to the present embodiment includes the protrusion 313*a*, the protrusion 313*b*, the protrusion 393*a*, and/or the protrusion 393*b*. Therefore, even when an excessive acceleration is applied to the inertial sensor 300, the occurrence of cracks or chips can be suppressed or avoided in the first comb-teeth movable electrode 223*a*, the second comb-teeth movable electrode 223*b*, the third comb-teeth movable electrode 223*c*, the fourth comb-teeth movable electrode 223*d*, the first comb-teeth fixed electrode 123*a*, the second comb-teeth fixed electrode 123*b*, the third comb-teeth fixed electrode 123*c*, and/or the fourth comb-teeth fixed electrode 123*d*.

Further, the protrusion 313*a* suppresses the first comb-teeth movable electrode 223*a*, the second comb-teeth movable electrode 223*b*, the first comb-teeth fixed electrode 123*a*, and/or the second comb-teeth fixed electrode 123*b* from coming into contact with or colliding with the bottom surface of the cavity 103*c*. Further, the protrusion 393*a* suppresses the first comb-teeth movable electrode 223*a*, the second comb-teeth movable electrode 223*b*, the first comb-teeth fixed electrode 123*a*, and/or the second comb-teeth fixed electrode 123*b* from coming into contact with or colliding with the bottom surface of the cavity 203*c*.

In other words, the first comb-teeth movable electrode 223*a*, the second comb-teeth movable electrode 223*b*, the first comb-teeth fixed electrode 123*a*, and/or the second comb-teeth fixed electrode 123*b* is protected so as not to come into contact with or collide with the bottom surface of the cavity 103*c* by the protrusion 313*a*. Further, the first comb-teeth movable electrode 223*a*, the second comb-teeth movable electrode 223*b*, the first comb-teeth fixed electrode 123*a*, and/or the second comb-teeth fixed electrode 123*b* is protected so as not to come into contact with or collide with the bottom surface of the cavity 203*c* by the protrusion 393*a*.

Further, the protrusion 313*b* suppresses the third comb-teeth movable electrode 223*c*, the fourth comb-teeth movable electrode 223*d*, the third comb-teeth fixed electrode 123*c*, and/or the fourth comb-teeth fixed electrode 123*d* from coming into contact with or colliding with the bottom surface of the cavity 103*c*. Further, the protrusion 393*b* suppresses the third comb-teeth movable electrode 223*c*, the fourth comb-teeth movable electrode 223*d*, the third comb-teeth fixed electrode 123*c*, and/or the fourth comb-teeth fixed electrode 123*d* from coming into contact with or colliding with the bottom surface of the cavity 203*c*.

In other words, the third comb-teeth movable electrode 223*c*, the fourth comb-teeth movable electrode 223*d*, the third comb-teeth fixed electrode 123*c*, and/or the fourth comb-teeth fixed electrode 123*d* is protected so as not to come into contact with or collide with the bottom surface of the cavity 103*c* by the protrusion 313*b*. Further, the third comb-teeth movable electrode 223*c*, the fourth comb-teeth movable electrode 223*d*, the third comb-teeth fixed electrode 123c, and/or the fourth comb-teeth fixed electrode 123d is protected so as not to come into contact with or collide with the bottom surface of the cavity 203c by the protrusion 393b.

Therefore, the inertial sensor 300 according to the present embodiment includes the protrusion 313a, the protrusion 313b, the protrusion 393a, and/or the protrusion 393b. Therefore, even when an excessive acceleration is applied to the inertial sensor 300, the occurrence of cracks and chips can be suppressed in the first comb-teeth movable electrode 223a, the second comb-teeth movable electrode 223b, the third comb-teeth movable electrode 223c, the fourth comb-teeth movable electrode 223d, the first comb-teeth fixed electrode 123a, the second comb-teeth fixed electrode 123b, the third comb-teeth fixed electrode 123c, and/or the fourth comb-teeth fixed electrode 123d.

Further, the protrusion 313a, the protrusion 313b, the protrusion 393a, and/or the protrusion 393b has an effect of suppressing the first comb-teeth movable electrode 223a, the second comb-teeth movable electrode 223b, the third comb-teeth movable electrode 223c, the fourth comb-teeth movable electrode 223d, the first comb-teeth fixed electrode 123a, the second comb-teeth fixed electrode 123b, the third comb-teeth fixed electrode 123c, and/or the fourth comb-teeth fixed electrode 123d from adhering to the support substrate 103 or the lid 203.

3.3.4. Detector

A detector includes a first detector having the first comb-teeth movable electrode 223a, the first comb-teeth fixed electrode 123a, the second comb-teeth movable electrode 223b, and the second comb-teeth fixed electrode 123b, and a second detector having the third comb-teeth movable electrode 223c, the third comb-teeth fixed electrode 123c, the fourth comb-teeth movable electrode 223d and the fourth comb-teeth fixed electrode 123d. Each of the first detector and the second detector detects the acceleration in the X-axis direction.

In the inertial sensor 300, when the acceleration occurs on the − side in the X-axis direction, the gap between the first comb-teeth movable electrode 223a and the first comb-teeth fixed electrode 123a and the second comb-teeth movable electrode 223b and the second comb-teeth fixed electrode 123b increases in the first detector, and the gap between the third comb-teeth movable electrode 223c and the third comb-teeth fixed electrode 123c and the fourth comb-teeth movable electrode 223d and the fourth comb-teeth fixed electrode 123d decreases in the second detector.

Further, when the acceleration occurs on the + side in the X-axis direction, the gap between the first comb-teeth movable electrode 223a and the first comb-teeth fixed electrode 123a and the second comb-teeth movable electrode 223b and the second comb-teeth fixed electrode 123b decreases in the first detector, and the gap between the third comb-teeth movable electrode 223c and the third comb-teeth fixed electrode 123c and the fourth comb-teeth movable electrode 223d and the fourth comb-teeth fixed electrode 123d increases in the second detector.

Therefore, the inertial sensor 300 according to the present embodiment can detect the acceleration on the + side in the X-axis direction and the acceleration on the − side in the X-axis direction by detecting the expansion or reduction of the gap between the first detector and the reduction or expansion of the gap between the second detector as the change in capacitance.

Hereinbefore, as described above, according to the inertial sensor 300 according to the present embodiment, the following effects can be obtained.

The inertial sensor 300 according to the present embodiment includes the support substrate 103, the lid 203 provided to face the support substrate 103, the movable frame 213 provided between the support substrate 103 and the lid 203, the first comb-teeth movable electrode 223a provided in the movable frame 213, the protrusion 313a and/or the protrusion 393a provided on at least one of the support substrate 103 or the lid 203 and overlapping the tip end or the base part of the first comb-teeth movable electrode 223a in a plan view.

As described above, in a plan view, the protrusion 313a and/or the protrusion 393a is provided which overlaps the tip end or the base part of the first comb-teeth movable electrode 223a. Therefore, even when an excessive acceleration is applied to the inertial sensor 300, the occurrence of cracks or chips can be suppressed or avoided in the first comb-teeth movable electrode 223a and/or the second comb-teeth movable electrode 223b.

Therefore, a highly reliable inertial sensor 300 can be realized by suppressing the occurrence of cracks or chips in the MEMS structure that causes a failure.

The inertial sensor 300 according to the present embodiment further includes the first fixed frame 113a provided between the support substrate 103 and the lid 203, and the first comb-teeth fixed electrode 123a provided in the first fixed frame 113a, in which the protrusion 313a and/or the protrusion 393a overlaps the first comb-teeth fixed electrode 123a in a plan view.

As described above, the protrusion 313a and/or the protrusion 393a is included which overlaps the first comb-teeth fixed electrode 123a in a plan view. Therefore, even when an excessive acceleration is applied to the inertial sensor 300, the occurrence of cracks or chips can be suppressed or avoided in the first comb-teeth fixed electrode 123a.

Further, in the inertial sensor 300 according to the present embodiment, the protrusion 313a and/or the protrusion 393a overlaps the joint part of the first comb-teeth movable electrode 223a and the movable frame 213 in a plan view.

As described above, the protrusion 313a and/or the protrusion 393b overlaps the joint part of the first comb-teeth movable electrode 223a and the movable frame 213 in a plan view. Therefore, even when an excessive acceleration is applied to the inertial sensor 300, the occurrence of cracks or chips can be suppressed or avoided in the first comb-teeth movable electrode 223a or the movable frame 213.

Further, in the inertial sensor 300 according to the present embodiment, the protrusion 313a overlaps the base part of the first comb-teeth movable electrode 223a in a plan view.

As described above, the protrusion 313a and/or the protrusion 393a overlaps the base part of the first comb-teeth movable electrode 223a in a plan view. Therefore, even when an excessive acceleration is applied to the inertial sensor 300, the occurrence of cracks or chips can be suppressed or avoided in the first comb-teeth movable electrode 223a or the movable frame 213.

Further, in the inertial sensor 300 according to the present embodiment, the protrusion 313a and/or the protrusion 393a overlaps the tip end of the first comb-teeth movable electrode 223a in a plan view.

As described above, the protrusion 313a and/or the protrusion 393a overlaps the tip end of the first comb-teeth movable electrode 223a in a plan view. Therefore, even when an excessive acceleration is applied to the inertial sensor 300, the occurrence of cracks or chips can be suppressed or avoided in the first comb-teeth movable electrode 223a or the movable frame 213.

Further, in the inertial sensor 300 according to the present embodiment, the protrusion 313*a* and/or the protrusion 393*a* overlaps from the base part to the tip end of the first comb-teeth movable electrode 223*a* and from the base part to the tip end of the first comb-teeth fixed electrode 123*a* in a plan view.

As described above, the protrusion 313*a* and/or the protrusion 393*a* overlaps from the base part to the tip end of the first comb-teeth movable electrode 223*a* and from the base part to the tip end of the first comb-teeth fixed electrode 123*a* in a plan view. Therefore, even when an excessive acceleration is applied to the inertial sensor 300, the occurrence of cracks or chips can be suppressed or avoided in the first comb-teeth movable electrode 223*a* and/or the first comb-teeth fixed electrode 123*a*.

The inertial sensor 300 according to the present embodiment further includes the first spring 283*a* and the second spring 283*b* that hold the movable frame 213, and the fixing area 253 that fixes the movable frame 213 to the support substrate 103 via the first spring 283*a* and the second spring 283*b*, in which the movable frame 213 has the border 213F that surrounds the first comb-teeth movable electrode 223*a*, the first spring 283*a* is coupled to the first side 213*a* of the border 213F, and the first comb-teeth movable electrode 223*a* is provided on the second side 213*b* that intersects the first side 213*a*.

As described above, the first comb-teeth movable electrode 223*a* is provided in the movable frame 213. Therefore, even when an excessive acceleration is applied to the inertial sensor 300, the occurrence of cracks or chips can be suppressed or avoided in the first comb-teeth movable electrode 223*a*.

4. Embodiment 4

A schematic configuration of an inertial sensor 400 according to Embodiment 4 will be described with reference to FIG. 9.

Figure 9:
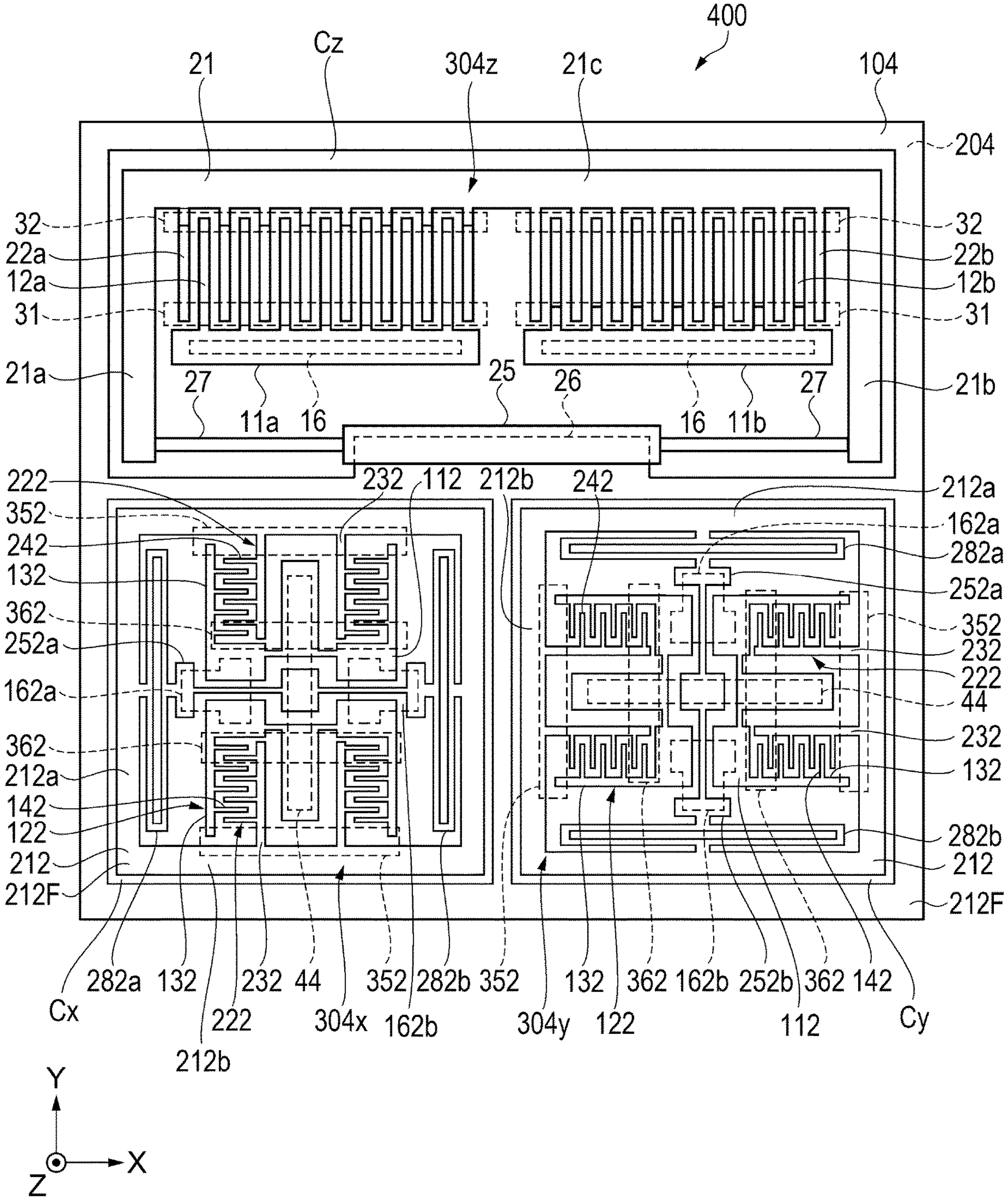
FIG. 9 is a plan view of an inertial sensor according to Embodiment 4.

FIG. 9 is a plan view schematically illustrating the inertial sensor 400 according to Embodiment 4. In FIG. 9, a lid 204 is made transparent for convenience of description. Further, the same parts as those in the above embodiments are denoted by the same reference numerals, and the redundant description will be omitted.

The inertial sensor 400 is a three-axis acceleration sensor that can independently detect the acceleration of the X axis, the Y axis, and the Z axis.

The inertial sensor 400 includes a support substrate 104, a lid 204 bonded to the support substrate 104, and an element 304*x*, an element 304*y*, and an element 304*z* that are provided between the support substrate 104 and the lid 204.

4.1. Support Substrate

The support substrate 104 has cavities Cx, Cy, and Cz including a recess.

The mounts 162*a*, 162*b*, and 44 and protrusions 352 and 362 are provided in the cavity Cx and the cavity Cy, respectively.

Mounts 16 and 26 and the protrusions 31 and 32 are provided in the cavity Cz.

The support substrate 104 is made of a silicon substrate and can be formed by patterning the silicon substrate. The support substrate 104 may be a glass substrate or a ceramic substrate.

4.2. Lid

The lid 204 has cavities (not illustrated) corresponding to the cavities Cx, Cy, and Cz of the support substrate 104, respectively. Further, protrusions facing the protrusions 31, 32, 352, and 362 are provided in the cavities of the lid 204.

In the present embodiment, the lid 204 is made of a glass substrate and can be formed by patterning the glass substrate. The lid 204 may be a silicon substrate or a ceramic substrate.

4.3. Element

In the present embodiment, the element has three elements including the element 304*x*, the element 304*y*, and the element 304*z*.

4.3.1. Element 304*x*

The element 304*x* detects the acceleration in the X-axis direction.

The element 304*x* has the same structure as the element 302 of Embodiment 2, and, in order to be able to detect the acceleration in the X-axis direction, the disposition directions of the comb-teeth movable electrode 222 and the comb-teeth fixed electrode 122 are rotated 90 degrees counterclockwise with respect to those in Embodiment 2.

The comb-teeth movable electrode 222 includes a movable electrode arm 232 and a movable electrode finger 242. Further, the comb-teeth fixed electrode 122 facing the comb-teeth movable electrode 222 includes a fixed electrode arm 132 and a fixed electrode finger 142.

The comb-teeth movable electrode 222 and the comb-teeth fixed electrode 122 overlap the protrusion 352 and the protrusion 362 in a plan view.

The protrusion 352 overlaps the joint part of the movable electrode arm 232 and the movable frame 212, the base part of the movable electrode arm 232, and the tip end of the fixed electrode arm 132.

The protrusion 362 overlaps the joint part of the fixed electrode arm 132 and the fixed frame 112, the base part of the fixed electrode arm 132, and the tip end of the movable electrode arm 232.

Instead of the protrusion 352 and/or the protrusion 362, those illustrated in other embodiments may be employed. For example, instead of the protrusion 352 and/or the protrusion 362, one or more of the protrusion 312, the protrusion 322, the protrusion 332, or the protrusion 372 described in Embodiment 2 may be employed.

4.3.2. Element 304*y*

The element 304*y* detects the acceleration in the Y-axis direction. The element 304*y* has the same structure as the element 302 of Embodiment 2.

The comb-teeth movable electrode 222 includes a movable electrode arm 232 and a movable electrode finger 242. Further, the comb-teeth fixed electrode 122 facing the comb-teeth movable electrode 222 includes a fixed electrode arm 132 and a fixed electrode finger 142.

The comb-teeth movable electrode 222 and the comb-teeth fixed electrode 122 overlap the protrusion 352 and the protrusion 362 in a plan view. Instead of the protrusion 352 and/or the protrusion 362, those illustrated in other embodiments may be employed. For example, instead of the protrusion 352 and/or the protrusion 362, one or more of the protrusion 312, the protrusion 322, the protrusion 332, or the protrusion 372 described in Embodiment 2 may be employed.

4.3.3. Element 304*z*

The element 304*z* detects an acceleration in the Z-axis direction. The element 304*z* has the same structure as the element 3 of Embodiment 1.

The first comb-teeth movable electrode 22*a* and the second comb-teeth movable electrode 22*b*, and the first comb-teeth fixed electrode 12*a* and the second comb-teeth fixed electrode 12*b* overlap the protrusions 31 and 32 in a plan view. Instead of the protrusion 31 and/or the protrusion 32, those illustrated in other embodiments may be employed. For example, instead of the protrusion 31 and/or the protrusion 32, one or a plurality of the protrusions 33, 34, 35, or 37 described in Embodiment 1 may be employed.

Hereinbefore, as described above, according to the inertial sensor 400 according to the present embodiment, the following effects can be obtained in addition to the effects of the above-described embodiments.

The inertial sensor 400 according to the present embodiment includes the support substrate 104, the lid 204 provided to face the support substrate 104, the movable frame 21 provided between the support substrate 104 and the lid 204, the first comb-teeth movable electrode 22*a* provided in the movable frame 21, and the protrusion 31 or the protrusion 32 provided on at least one of the support substrate 104 or the lid 204 and overlapping the tip end or the base part of the first comb-teeth movable electrode 22*a* in a plan view.

As described above, in a plan view, the protrusion 31 and/or the protrusion 32 is included which overlaps the tip end and/or the base part of the first comb-teeth movable electrode 22*a*. Therefore, even when an excessive acceleration is applied to the inertial sensor 400, the occurrence of cracks or chips can be suppressed or avoided in the first comb-teeth movable electrode 22*a*.

Therefore, a highly reliable inertial sensor 400 can be realized by suppressing the occurrence of cracks or chips in the MEMS structure that causes a failure.

The inertial sensor 400 according to the present embodiment includes the support substrate 104, the lid 204 provided to face the support substrate 104, the movable frame 212 provided between the support substrate 104 and the lid 204, the comb-teeth movable electrode 222 provided in the movable frame 212, and the protrusion 352 or the protrusion 362 provided on at least one of the support substrate 104 or the lid 204 and overlapping the tip end or the base part of the comb-teeth movable electrode 222 in a plan view.

As described above, in a plan view, the protrusion 352 or the protrusion 362 is included which overlaps the tip end or the base part of the comb-teeth movable electrode 222. Therefore, even when an excessive acceleration is applied to the inertial sensor 400, the occurrence of cracks or chips can be suppressed or avoided in the comb-teeth movable electrode 222.

Therefore, a highly reliable inertial sensor 400 can be realized by suppressing the occurrence of cracks or chips in the MEMS structure that causes a failure.

The inertial sensor 400 according to the present embodiment further includes the beam 27 as the spring that holds the movable frame 21, and the fixing area 25 that fixes the movable frame 21 to the support substrate 104 via the beam 27, in which the movable frame 21 has the first extension 21*a* that has one end coupled to one end of the beam 27, the second extension 21*b* that has one end coupled to the other end of the beam 27, and the coupler 21*c* that couples the other end of the first extension 21*a* and the other end of the second extension 21*b*, and the first comb-teeth movable electrode 22*a* is provided in the coupler 21*c*.

As described above, the first comb-teeth movable electrode 22*a* is provided in the coupler 21*c* of the movable frame 21. Therefore, even when an excessive acceleration is applied to the inertial sensor 400, the occurrence of cracks or chips can be suppressed or avoided in the first comb-teeth movable electrode 22*a*.

The inertial sensor 400 according to the present embodiment further includes the first spring 282*a* that holds the movable frame 212, and the first fixing area 252*a* that fixes the movable frame 212 to the support substrate 104 via the first spring 282*a*, in which the movable frame 212 has the border 212F that surrounds the comb-teeth movable electrode 222, the first spring 282*a* is coupled to the first side 212*a* of the border 212F, and the comb-teeth movable electrode 222 is provided on the second side 212*b* that intersects the first side 212*a*.

As described above, the comb-teeth movable electrode 222 is provided in the movable frame 212. Therefore, even when an excessive acceleration is applied to the inertial sensor 400, the occurrence of cracks or chips can be suppressed or avoided in the comb-teeth movable electrode 222.

5. Embodiment 5

5.1. Overview of Inertial Measurement Apparatus

Next, an inertial measurement apparatus 5000 including the inertial sensor 100 will be described with reference to FIGS. 10 and 11.

Figure 10:
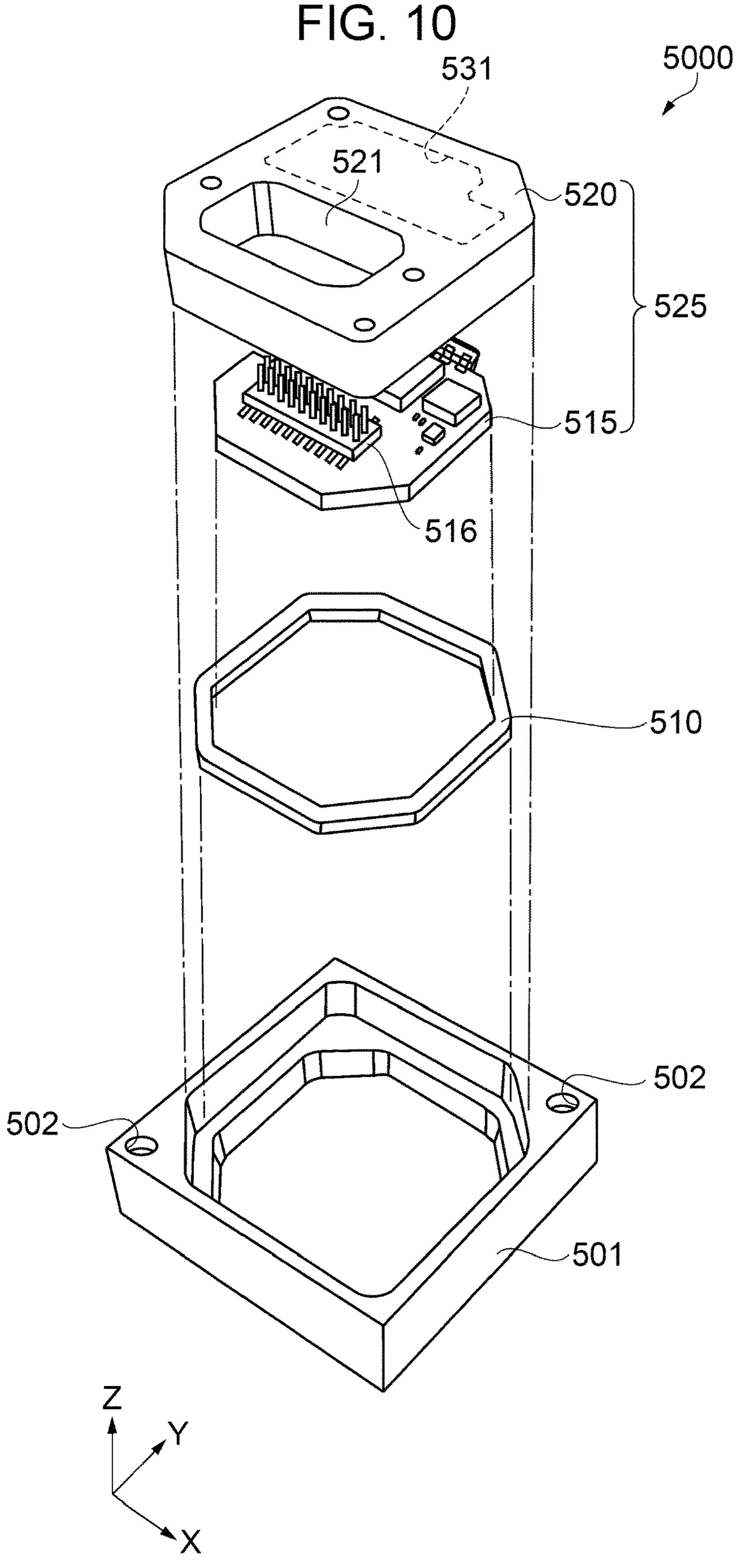
FIG. 10 is an exploded perspective view illustrating a schematic configuration of an inertial measurement apparatus.

FIG. 10 is an exploded perspective view illustrating a schematic configuration of the inertial measurement apparatus (internal measurement unit (IMU)) 5000 according to Embodiment 5. FIG. 11 is a perspective view of a substrate which is mounted on the inertial measurement apparatus 5000 and on which the inertial sensor 100 is mounted.

The inertial measurement apparatus 5000 is used as an apparatus which is mounted on an attached apparatus, such as a vehicle, a robot, a smartphone, or a portable movement meter, to detect the posture, behavior, and the like of the attached apparatus.

As illustrated in FIG. 10, the inertial measurement apparatus 5000 includes an outer case 501, a bonding member 510, and a sensor module 525, in which the sensor module 525 is fitted or inserted into the outer case 501 with the bonding member 510 interposed therebetween.

The outer case 501 is a box-shaped container having a rectangular parallelepiped outer shape without a lid. The material of the outer case 501 is, for example, aluminum. In addition, other metals, such as zinc and stainless steel, resins, or composites of metals and resins may be used.

The outer shape of the outer case 501 is a rectangular parallelepiped having a substantially square shape in a plan shape, and through-holes 502 are respectively formed in the vicinity of two vertices located in the diagonal direction of a square. The through-holes 502 are used when the inertial measurement apparatus 5000 is attached to an attached apparatus.

The sensor module 525 includes an inner case 520 and a circuit substrate 515.

The circuit substrate 515 is mounted with an acceleration detection unit 101 in which the inertial sensor 100 is incorporated, an external coupling connector 516, and the like.

The inner case 520 is a member that supports the circuit substrate 515, and has a shape that fits inside the outer case 501. As the material of the inner case 520, the same material as that of the outer case 501 can be used.

On the lower surface of the inner case 520, a recess 531 for preventing contact with the circuit substrate 515 and an opening 521 for exposing the connector 516 are formed.

Figure 11:
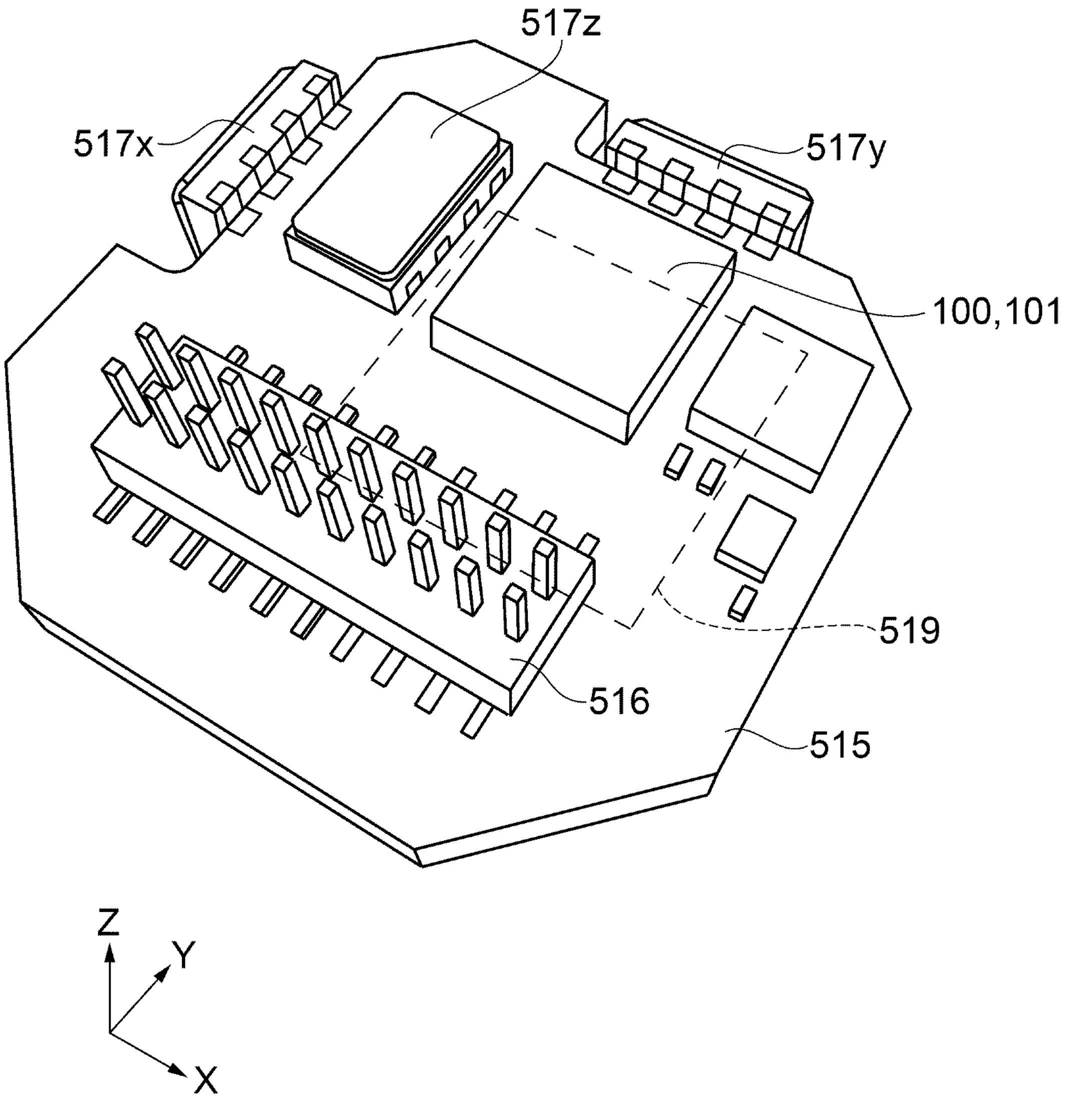
FIG. 11 is a perspective view of a substrate on which an inertial sensor is mounted.

With reference to FIG. 11, a configuration of the circuit substrate 515 on which the inertial sensor 100 is mounted will be described.

As illustrated in FIG. 11, the circuit substrate 515 is a multilayer substrate in which a plurality of through-holes are formed, and a glass epoxy substrate is used. In addition, the present disclosure is not limited to the glass epoxy substrate, and for example, a rigid substrate such as a composite substrate or a ceramic substrate may be used.

The connector 516, the acceleration detection unit 101, angular velocity sensors 517*x*, 517*y*, and 517*z*, and the like are mounted on the upper surface and the side surface of the circuit substrate 515.

The acceleration detection unit 101 is an acceleration sensor which is mounted with the inertial sensor 100 to measure the acceleration in the Z-axis direction.

The connector 516 is a plug-type connector, and includes two rows of coupling terminals disposed at equal pitches in the X-axis direction. In the present embodiment, the coupling terminals corresponding to 10 pins in one row and 20 pins in total in two rows are included, but the number of coupling terminals may be appropriately changed according to design specifications.

The angular velocity sensor 517*z* is a gyro sensor that detects the angular velocity of one axis in the Z-axis direction. As a preferable example, a vibration gyro sensor is used that uses crystallized quartz as a vibrator and detects the angular velocity from Coriolis force applied to a vibrating object. In addition, the present disclosure is not limited to the vibration gyro sensor, and a sensor using ceramic or silicon as the vibrator may be used.

Further, on the side surface of the circuit substrate 515 in the X-axis direction, the angular velocity sensor 517*x* that detects the angular velocity of one axis in the X-axis direction is mounted so that the mounting surface is orthogonal to the X-axis. Similarly, on the side surface of the circuit substrate 515 in the Y-axis direction, an angular velocity sensor 517*y* that detects an angular velocity of one axis in the Y-axis direction is mounted so that a mounting surface is orthogonal to the Y-axis.

The angular velocity sensors 517*x*, 517*y*, and 517*z* are not limited to the configuration using the three angular velocity sensors for the X axis, the Y axis, and the Z axis, respectively, and may be sensors that can detect the angular velocities of the three axes. For example, a sensor device may be used which can detect the angular velocities of the three axes with one device or a package.

The acceleration detection unit 101 is an acceleration sensor for measuring the acceleration in the Z-axis direction, but may measure the acceleration in the X-axis direction or the Y-axis direction. Further, a plurality of inertial sensors 100 may be mounted to detect the acceleration, for example, in two-axis directions, such as the Z-axis direction and the Y-axis direction or the Z-axis direction and the X-axis direction, or in three-axis directions, such as the X-axis direction, the Y-axis direction, and the Z-axis direction.

A control IC 519 as a controller is mounted on the lower surface of the circuit substrate 515.

The control IC 519 is a micro controller unit (MCU), has a built-in storage including a non-volatile memory, an A/D converter, and the like, and controls each portion of the inertial measurement apparatus 5000. The storage stores a program that defines an order and content for detecting the acceleration and the angular velocity, a program that digitizes detected data and incorporates the detected data into packet data, accompanying data, and the like. A plurality of other electronic components are mounted on the circuit substrate 515 in addition to the above programs and data.

According to the inertial measurement apparatus 5000, since the acceleration detection unit 101 including the inertial sensor 100 is used, the inertial measurement apparatus 5000 can be provided which has excellent impact resistance and improved reliability.

As described above, according to the inertial measurement apparatus 5000 including the inertial sensor 100 according to the present embodiment, a highly reliable inertial measurement apparatus can be provided in addition to the effect of Embodiment 1.

In the present embodiment, the inertial measurement apparatus 5000 includes the inertial sensor 100, but the inertial measurement apparatus 5000 may include the inertial sensor 200, the inertial sensor 300, and/or the inertial sensor 400.

Hereinbefore, although the preferred embodiments are described, the present disclosure is not limited to the above-described embodiments. Further, the configuration of each portion of the present disclosure can be replaced with any configuration that exhibits the same functions as that of the above-described embodiments, or any configuration can be added.

What is claimed is:

1. An inertial sensor comprising:
- a substrate;
- a lid provided to face the substrate;
- a movable frame provided between the substrate and the lid;
- a fixed frame provided between the substrate and the lid;
- a comb-teeth movable electrode provided in the movable frame;
- a comb-teeth fixed electrode provided in the fixed frame; and
- a protrusion provided on at least one of the substrate or the lid and overlapping from a base part to a tip end of the comb-teeth movable electrode in a plan view, and
- the protrusion overlaps from a base part to a tip end of the comb-teeth fixed electrode in the plan view.

2. The inertial sensor according to claim 1, wherein
- the protrusion overlaps a joint part of the comb-teeth movable electrode and the movable frame in the plan view.

3. The inertial sensor according to claim 1, wherein
- the comb-teeth movable electrode includes
  - a movable electrode arm extending in a first direction, and
  - a movable electrode finger extending in a second direction intersecting the first direction from the movable electrode arm, and
- the protrusion is provided along the first direction.

4. The inertial sensor according to claim 3, wherein
- the protrusion overlaps a joint part of the movable electrode arm and the movable electrode finger in the plan view.

5. The inertial sensor according to claim 3, wherein
- the protrusion overlaps a base part of the movable electrode finger in the plan view.

6. The inertial sensor according to claim 3, wherein
- the protrusion overlaps a tip end of the movable electrode finger in the plan view.

7. The inertial sensor according to claim 3, wherein
- the comb-teeth fixed electrode includes
  - a fixed electrode arm facing the movable electrode arm, and
  - a fixed electrode finger extending in the second direction from the fixed electrode arm, and
- the protrusion overlaps from a base part to a tip end of the movable electrode finger, and from a base part to a tip end of the fixed electrode finger in a in the plan view.

8. The inertial sensor according to claim 1, further comprising:

a spring holding the movable frame; and a fixing area fixing the movable frame to the substrate via the spring, wherein the movable frame includes a first extension which has one end coupled to one end of the spring, a second extension which has one end coupled to another end of the spring, and a coupler that couples another end of the first extension and another end of the second extension, and the comb-teeth movable electrode is provided in the coupler.

9. The inertial sensor according to claim 1, further comprising:

a spring holding the movable frame; and a fixing area fixing the movable frame to the substrate via the spring, wherein the movable frame includes a border surrounding the comb-teeth movable electrode, the spring is coupled to a first side of the border, and the comb-teeth movable electrode is provided on a second side intersecting the first side.

10. An inertial measurement apparatus comprising the inertial sensor according to claim 1.

* * * * *